(12) United States Patent
Takeda

(10) Patent No.: US 10,927,949 B2
(45) Date of Patent: Feb. 23, 2021

(54) OPERATING DEVICE

(71) Applicant: ALPS ALPINE CO., LTD., Tokyo (JP)

(72) Inventor: Yu Takeda, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 16/782,549

(22) Filed: Feb. 5, 2020

(65) Prior Publication Data

US 2020/0174513 A1    Jun. 4, 2020

Related U.S. Application Data

(63) Continuation of application No. PCT/JP2018/016640, filed on Apr. 24, 2018.

(30) Foreign Application Priority Data

Sep. 8, 2017  (JP) ................. 2017-173469

(51) Int. Cl.
| | |
|---|---|
| *F16H 59/10* | (2006.01) |
| *F16H 59/02* | (2006.01) |
| *B60K 20/00* | (2006.01) |
| *G05G 5/04* | (2006.01) |
| *G05G 5/05* | (2006.01) |
| *G05G 5/06* | (2006.01) |
| *F16H 61/24* | (2006.01) |

(52) U.S. Cl.
CPC ............ *F16H 59/10* (2013.01); *B60K 20/00* (2013.01); *F16H 59/0278* (2013.01); *G05G 5/04* (2013.01);
(Continued)

(58) Field of Classification Search
CPC ... G05G 5/04; G05G 5/05; G05G 5/06; B60K 20/00; B60K 20/02; F16H 59/02;
(Continued)

(56) References Cited

U.S. PATENT DOCUMENTS

| | | | |
|---|---|---|---|
| 4,229,993 A | 10/1980 | Andresen | |
| 7,921,746 B2 * | 4/2011 | Giefer | ............... F16H 61/22 74/473.23 |

(Continued)

FOREIGN PATENT DOCUMENTS

| | | | | |
|---|---|---|---|---|
| DE | 102013010572 A1 * | 1/2015 | ......... | F16H 59/0204 |
| EP | 3106715 A1 * | 12/2016 | ......... | F16H 59/0204 |

(Continued)

OTHER PUBLICATIONS

International Search Report dated Jul. 17, 2018 in PCT/JP2018/016640.

*Primary Examiner* — Adam D Rogers
(74) *Attorney, Agent, or Firm* — IPUSA, PLLC

(57) ABSTRACT

An operating device according to one embodiment includes a tiltable operating lever, a holding member that holds the operating lever, a locking member that restricts a tilt of the operating lever, a driving source, a hold driving mechanism driven by the driving source and configured to move the holding member between a hold position where the operating lever is held at a tilted position, and a return position where the operating lever returns to a predetermined position from the tilted position, and a lock driving mechanism driven by the driving source and configured to move the locking member between a lock position where the tilt of the operating lever is restricted, and a release position where restricting the tilt of the operating lever is released. The hold driving mechanism and the lock driving mechanism are respectively driven by the driving source at different timings.

18 Claims, 19 Drawing Sheets

(52) U.S. Cl.
CPC .............. *G05G 5/05* (2013.01); *G05G 5/06*
(2013.01); *F16H 2059/0282* (2013.01); *F16H 2061/243* (2013.01); *F16H 2061/245* (2013.01)

(58) Field of Classification Search
CPC .............. F16H 59/0278; F16H 59/10; F16H 2059/026; F16H 2059/0282; F16H 2061/242; F16H 2061/243; F16H 2061/245
See application file for complete search history.

(56) References Cited

U.S. PATENT DOCUMENTS

| | | | | |
|---|---|---|---|---|
| 8,316,734 | B2 * | 11/2012 | Giefer | F16H 61/22 |
| | | | | 74/473.25 |
| 8,336,418 | B2 * | 12/2012 | Giefer | F16H 59/0204 |
| | | | | 74/473.23 |
| 10,088,039 | B2 * | 10/2018 | Kim | F16H 59/0278 |
| 10,711,881 | B2 * | 7/2020 | Hessel | F16H 61/22 |
| 2016/0123460 | A1 * | 5/2016 | Tsukazaki | F16H 59/0204 |
| | | | | 74/473.23 |
| 2017/0159808 | A1 * | 6/2017 | Kuhne | F16H 59/0208 |
| 2020/0173540 | A1 * | 6/2020 | Takeda | B60K 20/02 |

FOREIGN PATENT DOCUMENTS

| | | | |
|---|---|---|---|
| JP | H05-043213 U | | 6/1993 |
| JP | H08-132957 | | 5/1996 |
| JP | 2008-302816 | | 12/2008 |
| JP | 2009-500238 | | 1/2009 |
| JP | 2016088498 A | * | 5/2016 |
| WO | 2017/090293 | | 6/2017 |

\* cited by examiner

OPERATING DEVICE

CROSS-REFERENCE TO RELATED APPLICATIONS

This application is a continuation application of International Application No. PCT/JP2018/016640 filed on Apr. 24, 2018 and designated the U.S., which is based upon and claims priority to Japanese Patent Application No. 2017-173469 filed on Sep. 8, 2017, the entire contents of which are incorporated herein by reference.

BACKGROUND OF THE INVENTION

1. Field of the Invention

Embodiments discussed herein are related to an operating device.

2. Description of the Related Art

Conventionally, operating devices (shifting devices or the like) having an operating lever that can be held at a plurality of positions, are utilized. Among such operating devices, there is a known operating device including a mechanism that automatically returns the operating lever to a predetermined position, and a mechanism that restricts the operating lever so as not to move to the predetermined position.

In the above-mentioned conventional operating device, two driving sources are required to drive the two mechanisms. However, when two driving sources are provided, there is a problem in that manufacturing cost and weight of the operating device increase.

Examples of the conventional operating device are described in Japanese Laid-Open Patent Publication No. H08-132957, and Japanese National Publication of International Patent Application No. 2009-500238, for example.

SUMMARY OF THE INVENTION

One object of the embodiments is to automatically return and restrict the operating lever by a single driving source.

According to one aspect of the embodiments, an operating device includes a tiltable operating lever; a holding member configured to hold the operating lever; a locking member configured to restrict a tilt of the operating lever; a driving source; a hold driving mechanism, driven by the driving source, and configured to move the holding member between a hold position where the operating lever is held at a tilted position, and a return position where the operating lever returns to a predetermined position from the tilted position; and a lock driving mechanism, driven by the driving source, and configured to move the locking member between a lock position where the tilt of the operating lever is restricted, and a release position where restricting the tilt of the operating lever is released, wherein the hold driving mechanism and the lock driving mechanism are respectively driven by the driving source at different timings.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF THE PREFERRED EMBODIMENTS

Figure 1:
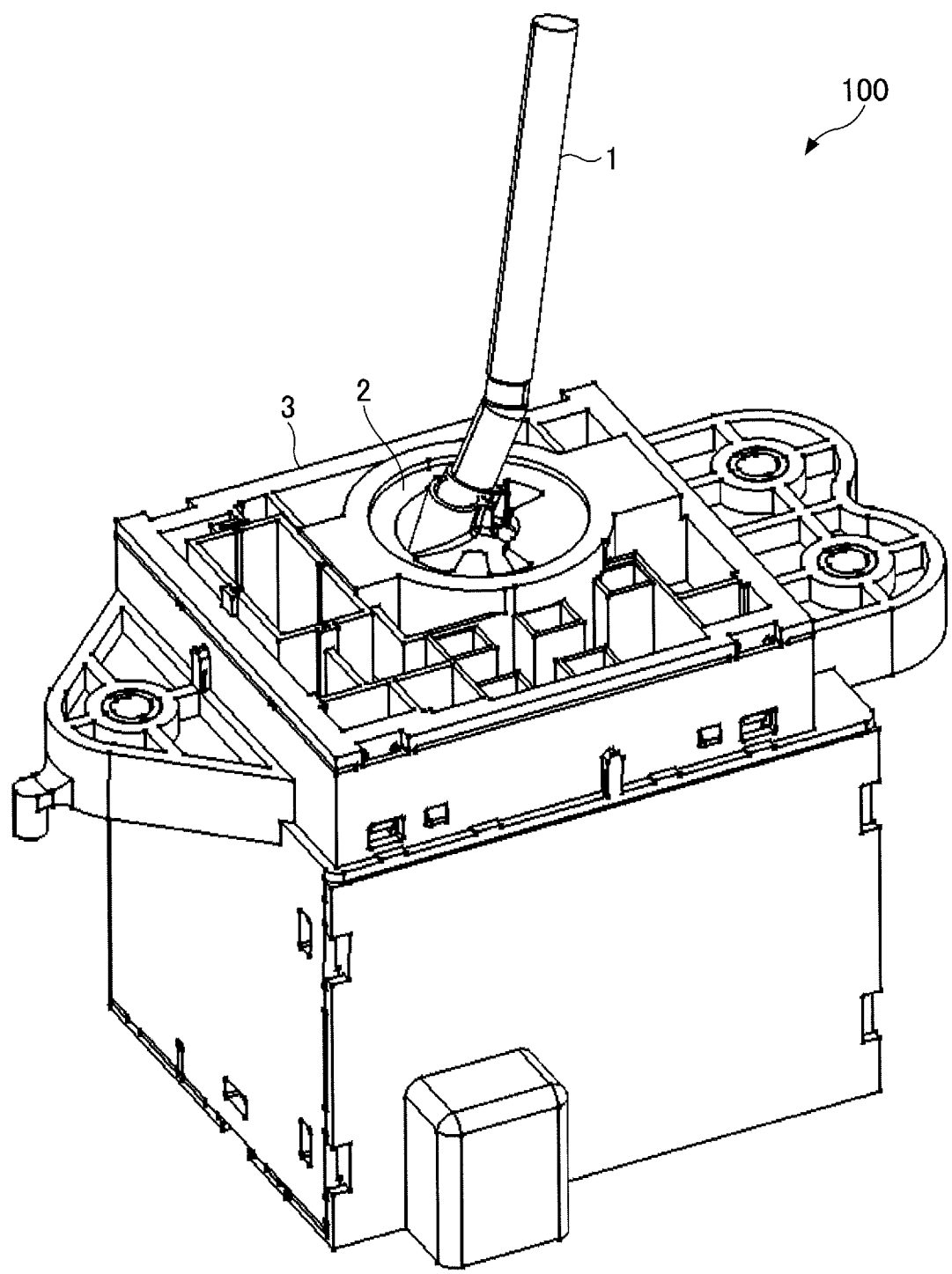
FIG. 1 is an external perspective view illustrating an example of an operating device.

Preferred embodiments of the present invention will be described in the following, by referring to the accompanying drawings. In the description of the specification and the drawings related to each embodiment, constituent elements having substantially the same functions or configurations will be designated by the same reference numerals, to omit repeating descriptions thereof. In addition, for the sake of convenience, although there are cases where directions are prescribed using an up-and-down direction, such cases are not intended to prescribe an installed state or a state of use of each embodiment, and the installation direction may be arbitrary as long as relative positional relationships are maintained.

Each embodiment of the present invention will be described in the following, by referring to the accompanying drawings. In the description of the specification and the drawings related to each embodiment, constituent elements having substantially the same functions or configurations will be designated by the same reference numerals, to omit repeating descriptions thereof. In addition, for the sake of convenience, although there are cases where directions are prescribed using an up-and-down direction, such cases are not intended to prescribe an installed state or a state of use of each embodiment, and the installation direction may be arbitrary as long as relative positional relationships are maintained.

An operating device 100 according to one embodiment will be described, by referring to FIG. 1 through FIG. 19. The operating device 100 according to this embodiment is a device provided with a tiltable operating lever 1 that may be held at a plurality of positions. The operating device 100 may be applied to a shifting device, a stalk switch (direction indicator), or the like of a vehicle. A description will be given for a case where the operating device 100 is the shifting device.

First, the structure of the operating device 100 will be described. FIG. 1 is an external perspective view illustrating an example of the operating device 100. The operating device 100 of FIG. 1 includes the operating lever 1, a socket 2, and a housing 3.

The operating lever 1 is a section that is operated by a user to switch gears of the vehicle, and corresponds to the so-called shift lever or select lever. The operating lever 1 is tiltable, and is held at a position according to the operation of the user, from among a plurality of positions respectively corresponding to different gears. The user can switch the gear to a desired gear by moving the operating lever 1 to the position corresponding to the desired gear.

Figure 2:
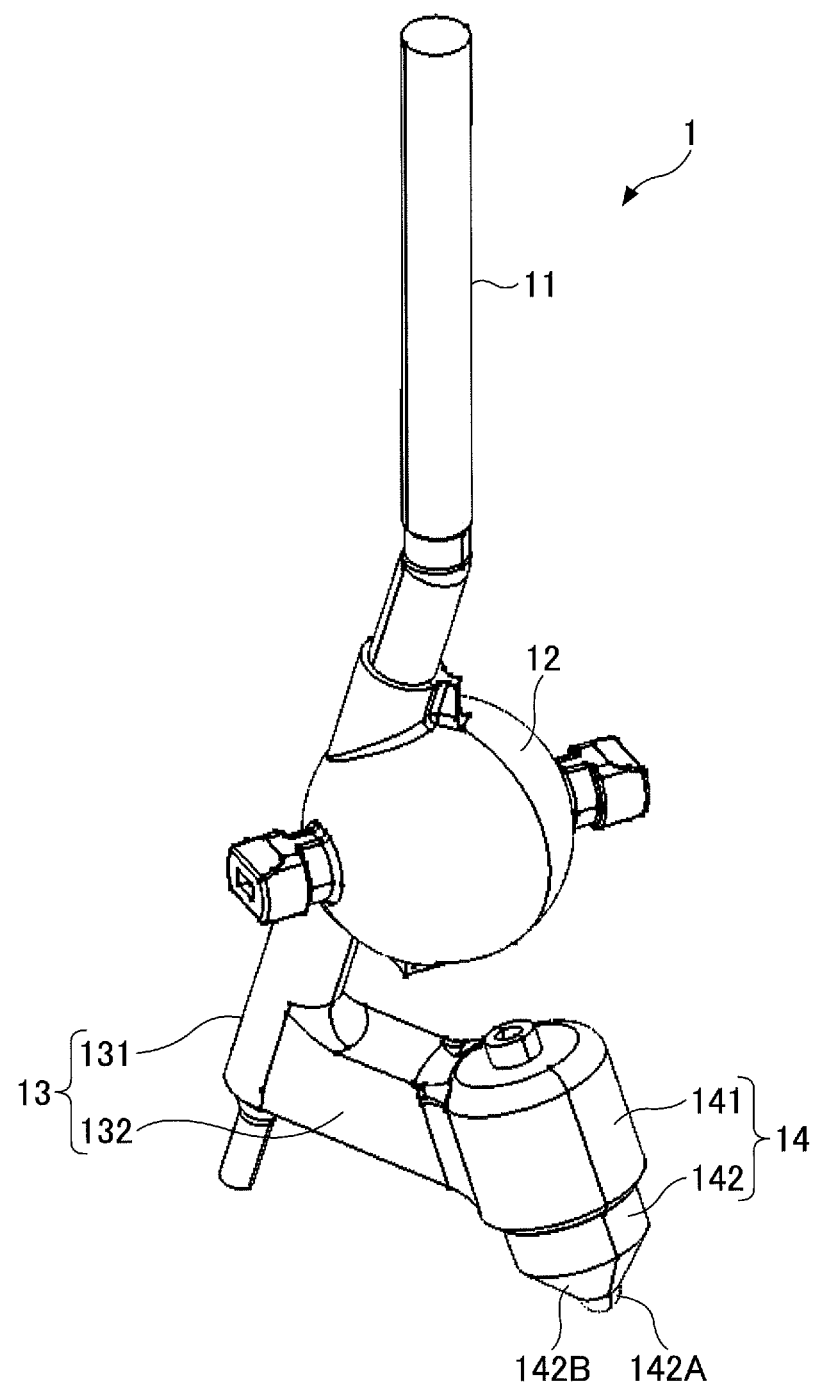
FIG. 2 is a perspective view illustrating an operating lever of FIG. 1.

FIG. 2 is a perspective view illustrating the operating lever 1 of FIG. 1. The operating lever 1 of FIG. 2 includes a shaft 11, a spherical section 12, a connecting section 13, and an actuator 14.

The shaft 11 is a tiltable rod-shaped member made of a metal. A section of the shaft 11 above the spherical section 12 (hereinafter simply referred to as an "upper section") is exposed to an outer side of the housing 3 from an upper surface of the socket 2. A knob may be provided on an upper end of the shaft 11 to facilitate gripping by the user.

The spherical section 12 is a spherical member made of a resin and fixed to the shaft 11. The spherical section 12 is arranged so that an axial direction (approximately the up-and-down direction in FIG. 2) of the upper section of the shaft 11 passes through a center of the spherical section 12, for example. The spherical section 12 forms a ball joint together with the socket 2. The shaft 11 is tiltably held by this ball joint. In other words, the spherical section 12 corresponds to a center of the tilt of the shaft 11.

The connecting section 13 is a member made of a resin and configured to connect the spherical section 12 and the actuator 14, and the connecting section 13 is fixed to the shaft 11. The spherical section 12, the connecting section 13, and a base section 141 of the actuator 14 to be described later, are formed integrally. The connecting section 13 includes a first section 131 that is fixed to the shaft 11, and a second section 132 that extends to a side from the first section 131.

The actuator 14 is a member made of a resin and configured to integrally tilt with the shaft 11, and the actuator 14 is provided on a tip end of the second section 132 of the connecting section 13. The actuator 14 includes the base section 141 that is hollow and provided on the tip end of the second section 132, and a contact section 142 that is hollow and fits into the base section 141.

The contact section 142 is a member that is slidable in the axial direction of the actuator 14 (approximately the up-and-down direction in FIG. 2), and the contact section 142 is urged (biased) toward the outer side of the axial direction (direction separating from the base section 141) by a compression coil spring that is provided on an inner side of the base section 141 and the contact section 142. The axial direction of the actuator 14 is arranged to pass through the center of the spherical section 12, for example. When the user operates the operating lever 1 to tilt, the contact section 142 tilts integrally with the shaft 11, while contacting a holding member 5.

The socket 2 is a member that holds the spherical section 12, and is provided on an upper surface of the housing 3. As described above, the socket 2 forms the ball joint together with the spherical section 12. The socket 2 includes a through-hole that may be inserted with the shaft 11 of the operating lever 1.

The housing 3 has an approximately rectangular parallelepiped shape, and the socket 2 is provided on the upper surface of the housing 3. The housing 3 is fixed between two front seats of the vehicle, for example.

Figure 3:
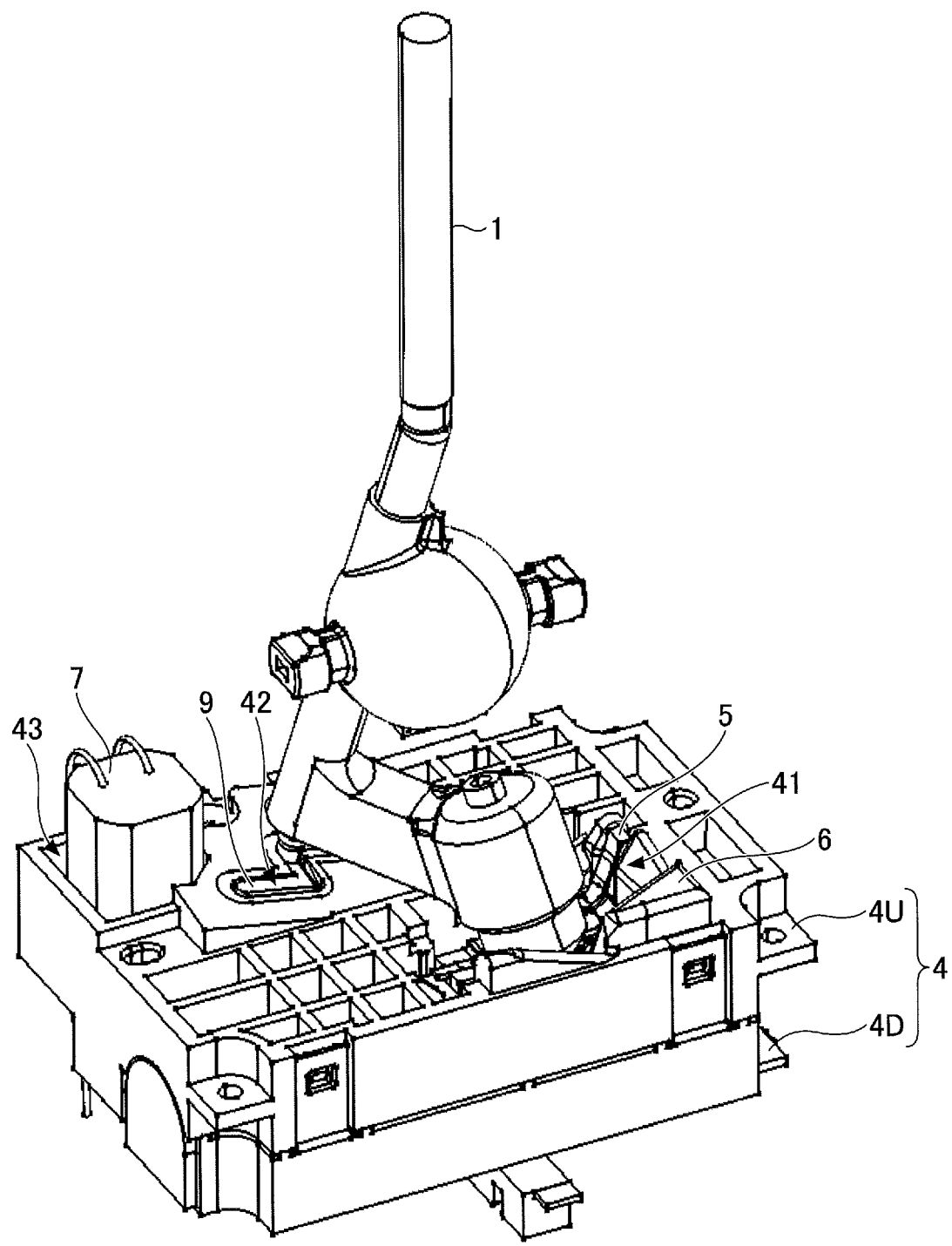
FIG. 3 is a perspective view illustrating an internal structure of the operating device of FIG. 1.

Next, an internal structure of the operating device 100 will be described. FIG. 3 is a perspective view illustrating the internal structure of the operating device 100 of FIG. 1. FIG. 3 corresponds to a diagram in which the housing 3 of FIG. 1 is omitted. The operating device 100 includes, inside the housing 3, a casing 4, the holding member 5, a return section 6, a motor 7, a driving mechanism 8, and a locking member 9.

The casing 4 is a member made of a resin and configured to hold an internal structure of the housing 3. The casing 4 has an approximately rectangular parallelepiped shape, and is fixed to the housing 3. The casing 4 includes an upper casing 4U forming an upper portion, and a lower casing 4D forming a lower portion. The upper casing 4D and the lower casing 4D are snap-fit and connected. A driving mechanism 8, that moves the holding member 5 and the locking member 9 up and down, is provided on an upper surface of the lower casing 4D (inside the casing 4), and on a lower surface of the lower casing 4D. The driving mechanism 8 will be described later.

Figure 4:
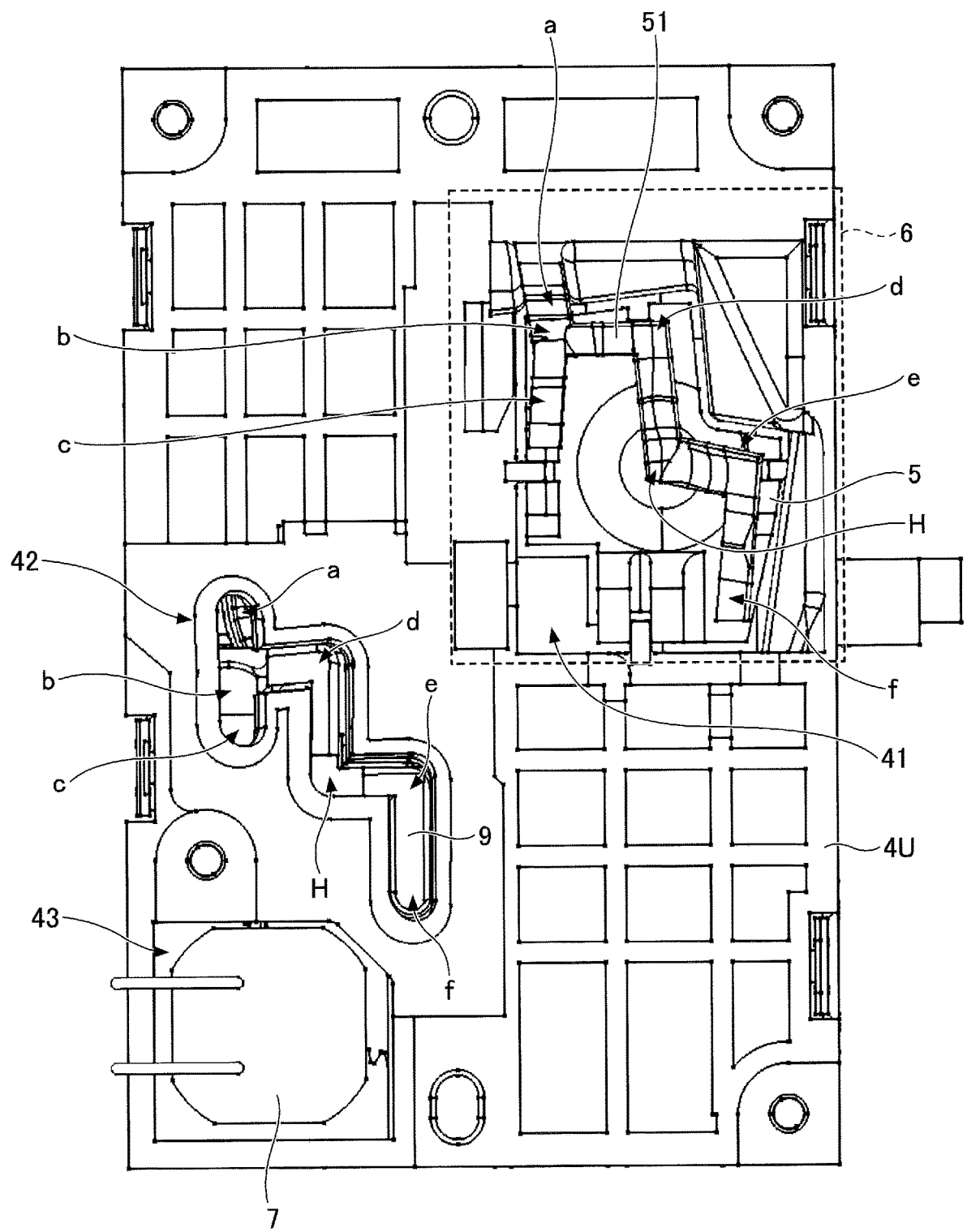
FIG. 4 is a plan view illustrating an upper casing of FIG. 3.

FIG. 4 is a plan view illustrating the upper casing 4U of FIG. 3. As illustrated in FIG. 4, the upper casing 4U includes the return section 6, an opening 41, a guide section 42, and an opening 43. The return section 6 will be described later.

The opening 41 is a through-hole formed in an upper surface of the upper casing 4U, and exposes the holding member 5 at the upper surface of the upper casing 4U. The opening 41 has a planar shape that is approximately the same as a planar shape of the holding member 5.

The guide section 42 is a through-hole famed in the upper surface of the upper casing 4U, and into which a lower end of the shaft 11 of the operating lever 1 is inserted, and this guide section 42 guides the tilt of the shaft 11. In other words, the shaft 11 tilts along the shape of the guide section 42. The guide section 42 has a plurality of positions respectively corresponding to the gears. In the example of the guide section 42 of FIG. 4, an upper end of a left column is "a", a center of the left column is "b", a lower end of the left column is "c", an upper end of a center column is "d", a lower end of the center column is "H" (Home), an upper end of a right column is "e", and a lower end of the right column is "f". "a" through "f" are respectively and suitably allocated to the gear positions such as "D" (Drive), "N" (Neutral), "R" (Reverse), or the like. In the following, a position corresponding to a gear X will be referred to as a X-position.

When the user operates the operating lever 1 to tilt, the gear of the vehicle is switched to the gear corresponding to the position where the lower end of the shaft 11 is positioned. For example, when the lower end of the shaft 11 is positioned at the d-position (upper end of the center column) of the guide section 42, the gear of the vehicle is switched to "d". The shape of the guide section 42, and the arrangement of the positions corresponding to each of the gears, are not limited to those of the example of FIG. 4.

The opening 43 is a through-hole formed in the upper surface of the upper casing 4U, and into which the motor 7 fixed to the lower casing 4D is inserted. In a case where the motor 7 can be accommodated inside the casing 4, the opening 43 does not need to be formed.

The holding member 5 is a member made of a resin and configured to hold the contact section 142 by making contact with the contact section 142 of the actuator 14. The holding member 5 holds the contact section 142, to hold the operating lever 1. The holding member 5 includes, on an upper surface thereof, a sliding path 51 having a shape corresponding to the guide section 42, and the contact section 142 makes sliding contact with the sliding path 51. The sliding path 51 includes a plurality of positions respectively corresponding to the gears. In the example of the holding member 5 of FIG. 4, an upper end of a left column corresponds to "a", a center of the left column corresponds to "b", a lower end of the left column corresponds to "c", an upper end of a center column corresponds to "d", a lower end of the center column corresponds to "H", an upper end of a right column corresponds to "e", and a lower end of the right column corresponds to "f".

A recess that holds a tip end portion 142A of the contact section 142 making contact therewith, is formed at each of the positions of the holding member 5. In other words, a projection is formed between each pair of adjacent positions of the holding member 5. When the user operates the operating lever 1 to tilt from one position to another position, the tip end portion 142A of the contact section 142 rides over the projection formed between the two positions, to generate a feeling of operation (click feeling). The user can easily recognize from this feeling of operation that the position of the operating lever 1 moved and that the gear is switched.

The holding member 5 is provided inside the casing 4 so that the tip end portion 142A of the contact section 142 can make contact with the sliding path 51. More particularly, the holding member 5 is provided inside the casing 4, so that the sliding path 51 is exposed at the upper surface of the upper casing 4U. In addition, the sliding path 51 is formed on the holding member 5, and the holding member 5 is arranged inside the casing 4, so that the gear corresponding to the position where the lower end of the shaft 11 is positioned matches the gear corresponding to the position where the contact section 142 makes contact with the sliding path 51. In other words, when the lower end of the shaft 11 is positioned at the X-position of the guide section 42, the tip end portion 142A of the contact section 142 is also positioned at the X-position of the sliding path 51.

Figure 5:
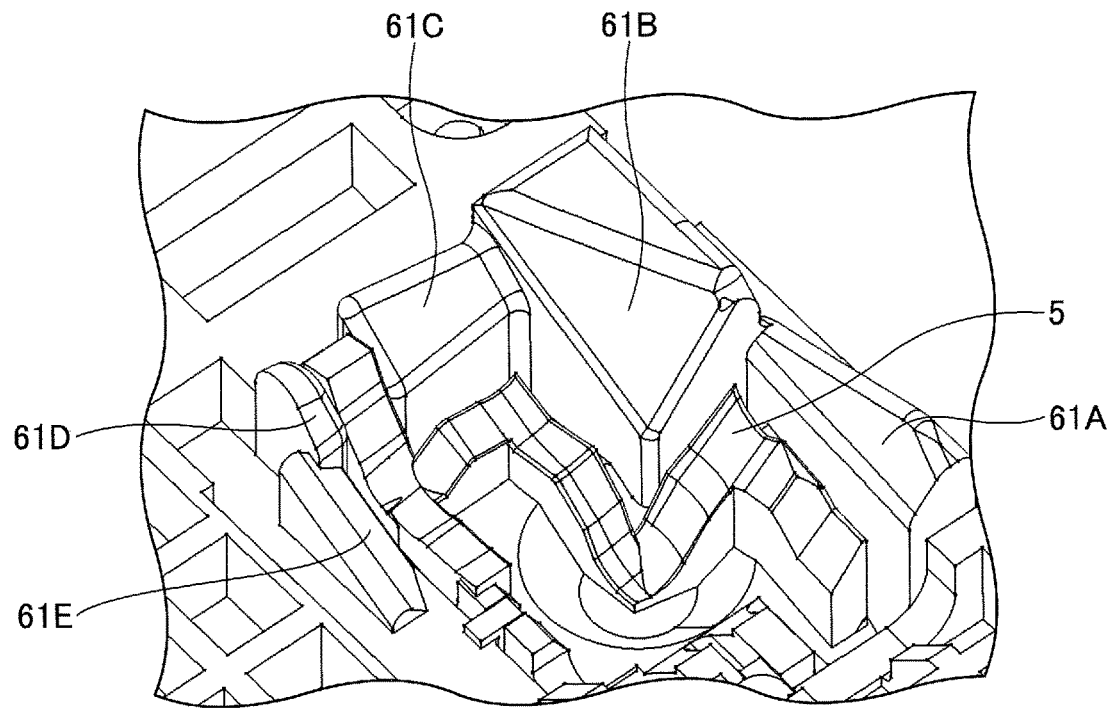
FIG. 5 is a partial enlarged diagram of a holding section positioned at a hold position.

In addition, the holding member 5 moves between a hold position and a return position. FIG. 5 is a partial enlarged diagram of the holding member 5 positioned at the hold position, and FIG. 6 is a partial enlarged diagram of the holding member 5 positioned at the return position.

Figure 6:
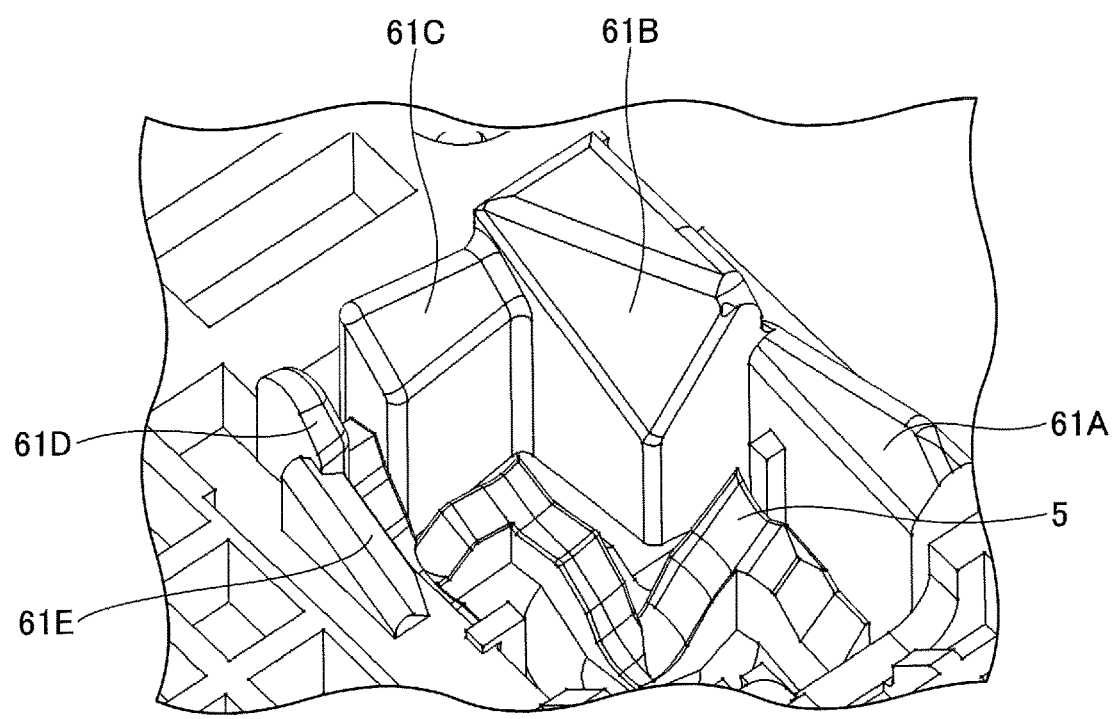
FIG. 6 is a partial enlarged diagram of the holding section positioned at a return position.

As illustrated in FIG. 5 and FIG. 6, the hold position is a position, that is located above the return position, and where the holding member 5 makes contact with the contact section 142. In a case where the holding member 5 is positioned at the hold position, the sliding path 51 makes contact with the tip end portion 142A of the contact section 142, and the operating lever 1 is held to the position to where the operating lever 1 is tilted by being operated, in a state where the contact section 142 is held.

On the other hand, the return position is a position, that is located below the hold position, and where the holding member 5 separates from (does not make contact with) the contact section 142. In a case where the holding member 5 is positioned at the return position, the holding member 5 is separated from the contact section 142, and returns the operating lever 1 to a predetermined position.

The return section 6 is a member made of a resin, provided so as to surround an outer periphery of the holding member 5. In a case where the holding member 5 moves from the hold position to the return position, the return section 6 makes contact with a sloping portion 142B of the contact section 142, and guides the contact section 142 to the predetermined position, to hold the contact section 142 at the predetermined position. In other words, the return section 6 automatically returns the operating lever 1 to the predetermined position when the holding member 5 moves to the return position. In the example of FIG. 4, the predetermined position is the H-position, however, the predetermined position is not limited to the H-position.

The return section 6 is formed, integrally with the upper casing 4, on the upper surface of the upper casing 4U. The return section 6 includes sloping surfaces 61A through 61E. When not distinguishing the sloping surfaces 61A through 61E from one another, these sloping surfaces will be referred to as sloping surfaces 61. The sloping surface 61 is provided at a peripheral edge portion of the opening 41, and is formed so that the sloping portion 142B of the contact section 142, making contact with the sloping surface 61, moves to the predetermined position due to a reaction force from the sloping surface 61 with respect to a biasing force of the compression coil spring.

More particularly, the sloping surface 61A moves the contact section 142 positioned at the f-position to the e-position. The sloping surface 61B moves the contact section 142 positioned at the d-position or the e-position to the H-position, and holds the contact section 142 at the H-position. The sloping surface 61C moves the contact section 142 positioned at the b-position to the d-position. The sloping surface 61D moves the contact section 142 positioned at the a-position to the b-position. The sloping surface 61E moves the contact section 142 positioned at the c-position to the b-position.

When the holding member 5 is positioned at the hold position, the operating lever 1 is held at one of the positions in a state where the contact section 142 is held by the holding member 5. When the holding member 5 moves from the hold position to the return position, the tip end portion 142A separates from the holding member 5, the sloping portion 142B makes contact with the sloping surface 61 that is provided on the outer periphery of the holding member 5, and the operating lever 1 successively moves to an adjacent position due to the reaction force with respect to the biasing force of the compression coil spring, to finally move to the predetermined position (H-position in the example of FIG. 4). When the operating lever 1 returns to the predetermined position, the operating lever 1 is held in a state where the sloping portion 142B makes contact with the sloping surface 61 corresponding to the predetermined position.

The motor 7 is a driving source configured to drive the driving mechanism 8. The motor 7 is fixed to the lower casing 4D. The motor 7 rotates according to a control signal from an external control circuit (ECU (Electronic Control Unit) or the like), to drive the driving mechanism 8. The control circuit may be included in the operating device 100.

The locking member 9 is a member that restricts the tilt of the operating lever 1, so that the operating lever 1 does not move to target positions, and the locking member 9 is arranged below the guide section 42. The locking member 9 includes a bottom portion 91, and a restricting portion 92. The restricting portion 92 is a portion that restricts the movement of the tip end of the shaft 11, so that the operating lever 1 does not tilt and move to the target positions. The restricting portion 92 is formed to project upward from the bottom portion 91. In this embodiment, the target positions include the e-position, the f-position, and the d-position. The locking member 9 includes a restricting portion 92A that restricts movements to the e-position and the f-position, and a restricting portion 92B that is lower than the restricting portion 92A.

Figure 7:
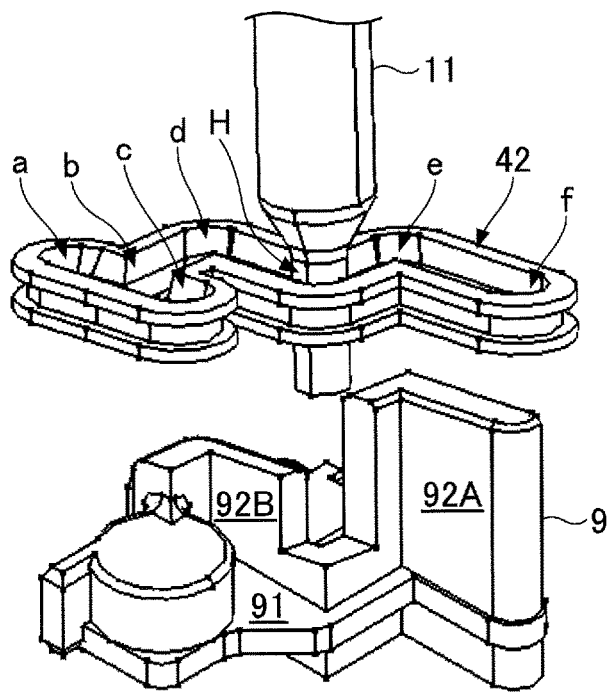
FIG. 7 is a partial enlarged diagram of a locking member positioned at a release position.

In addition, the locking member 9 moves among a release position, a first lock position, and a second lock position. When not distinguishing the first lock position and the second lock position, the first lock position and the second lock position may simply be referred to as a lock position. FIG. 7 is a partial enlarged diagram of the locking member 9 positioned at the release position, FIG. 8 is a partial enlarged diagram of the locking member 9 positioned at the first lock position, and FIG. 9 is a partial enlarged diagram of the locking member 9 positioned at the second lock position.

Figure 8:
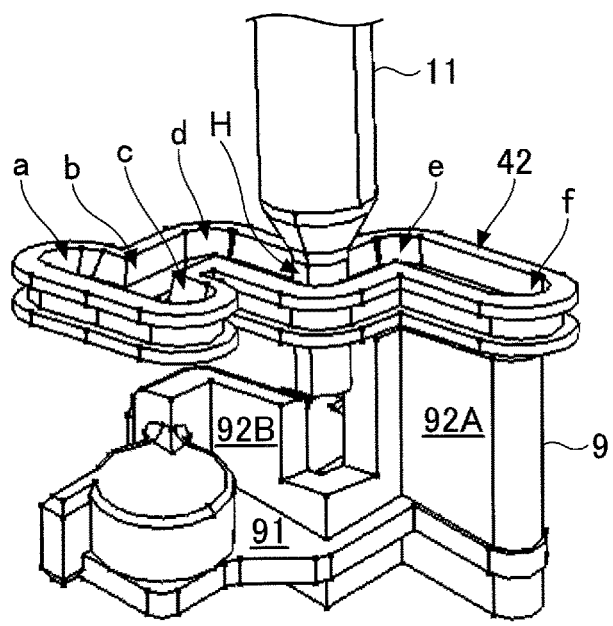
FIG. 8 is a partial enlarged diagram of the locking member positioned at a first lock position.
Figure 9:
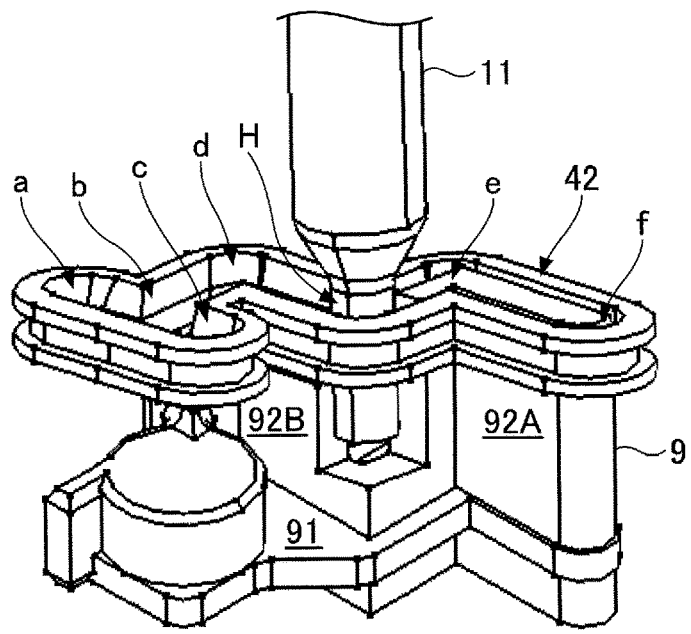
FIG. 9 is a partial enlarged diagram of the locking member positioned at a second lock position.

As illustrated in FIG. 7 through FIG. 9, the release position is a position lower than the first lock position and the second lock position. More particularly, as illustrated in FIG. 7, the release position is the position where the restricting portions 92A and 92B are positioned below the tip end of the shaft 11. When the locking member 9 is at the release position, the movement of the tip end of the shaft 11 is not restricted by the locking member 9, and thus, the operating lever 1 can be freely tilted. In other words, when the locking member 9 is at the release position, the operating lever 1 is released from the restricted state.

As illustrated in FIG. 7 through FIG. 9, the first lock position is a position higher than the release position and lower than the second lock position. More particularly, as illustrated in FIG. 8, the first lock position is the position where the restricting portion 92A is positioned above the tip end of the shaft 11, and the restricting portion 92B is positioned below the tip end of the shaft 11. When the locking member 9 is at the first lock position, the movement of the tip end of the shaft 11 is restricted by the restricting portion 92A, and thus, the operating lever 1 cannot be tilted to the e-position and the f-position. In other words, when the locking member 9 is at the first lock position, the tilt of the operating lever 1 to the e-position and the f-position is restricted.

As illustrated in FIG. 7 through FIG. 9, the second lock position is a position above the release position and the first lock position. More particularly, as illustrated in FIG. 9, the second lock position is the position where the restricting portions 92A and 92B is positioned above the tip end of the shaft 11. When the locking member 9 is at the second lock position, the movement of the tip end of the shaft 11 is restricted by the restricting portions 92A and 92B, and thus, the operating lever 1 cannot be tilted to the e-position, the f-position, and the d-position. In other words, when the locking member 9 is at the second lock position, the tilt of the operating lever 1 to the e-position, the f-position, and the d-position is restricted, and the operating lever 1 is locked to the H-position.

Figure 10:
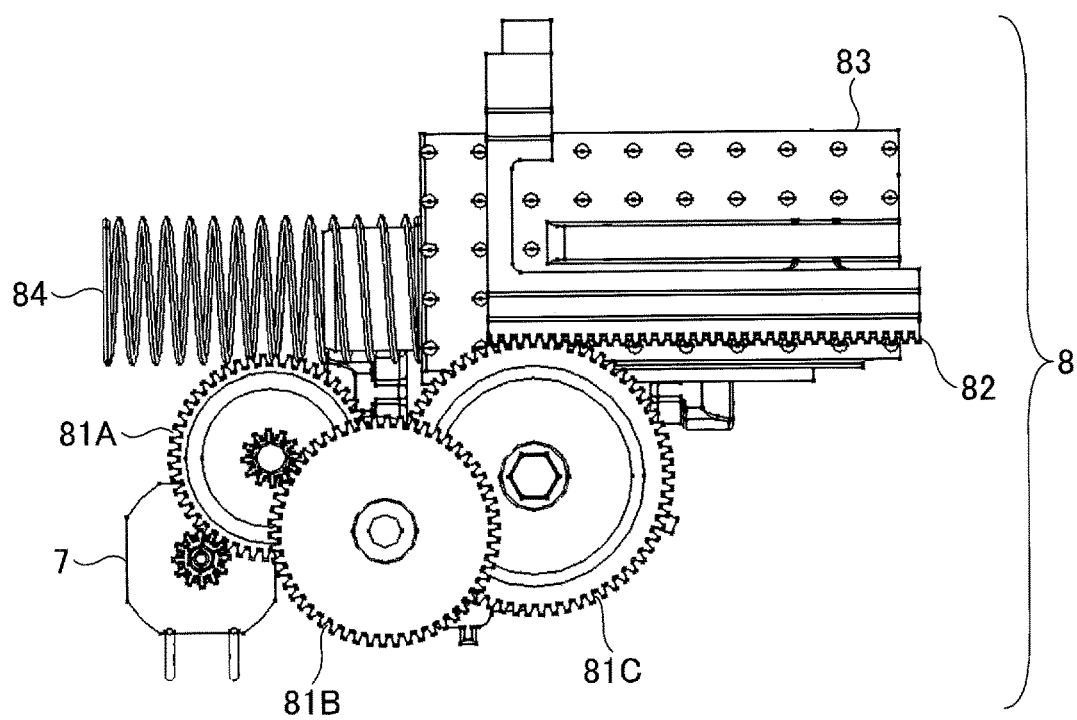
FIG. 10 is a bottom view illustrating a driving mechanism.
Figure 11:
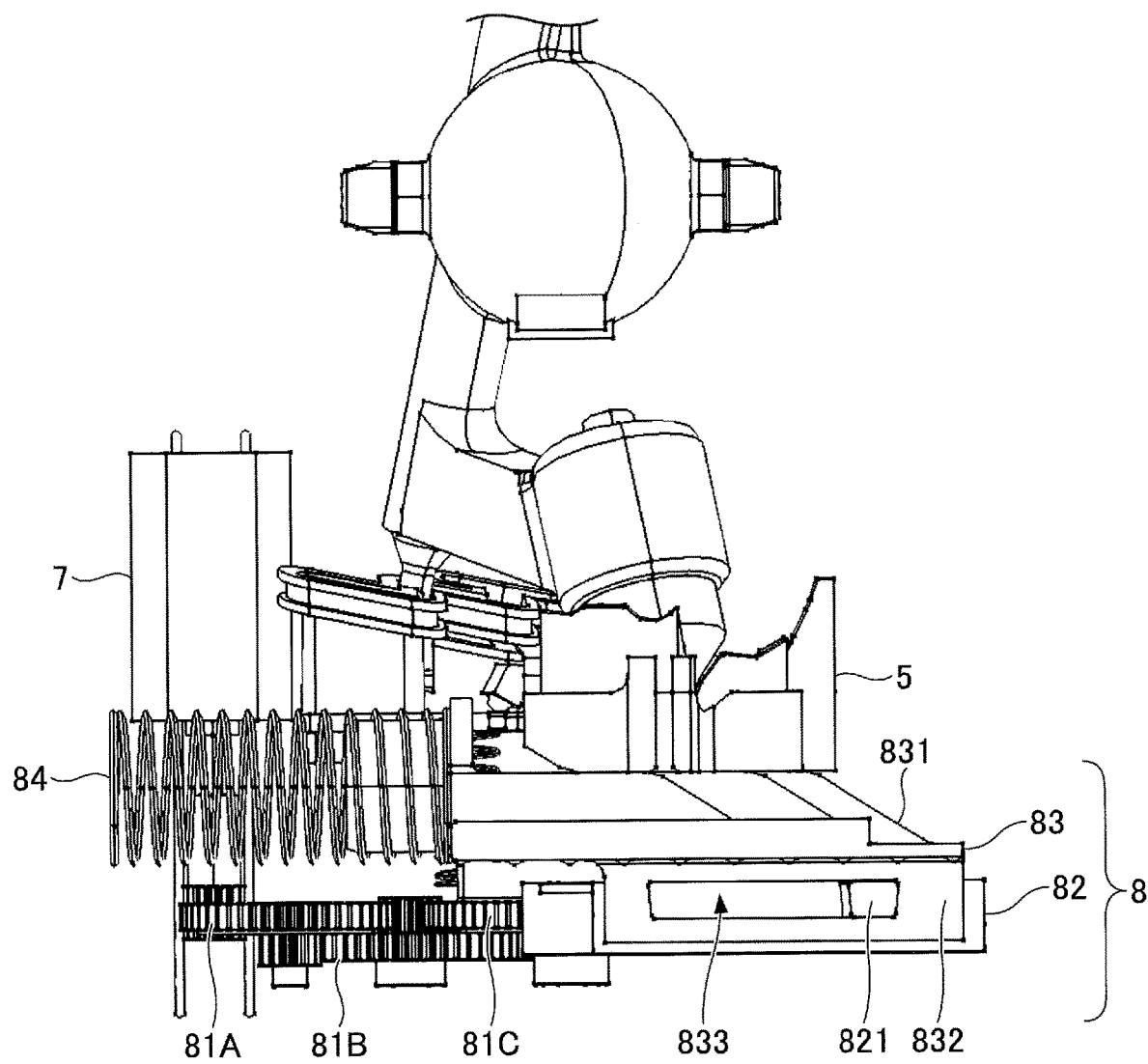
FIG. 11 is a front view illustrating the driving mechanism.
Figure 12:
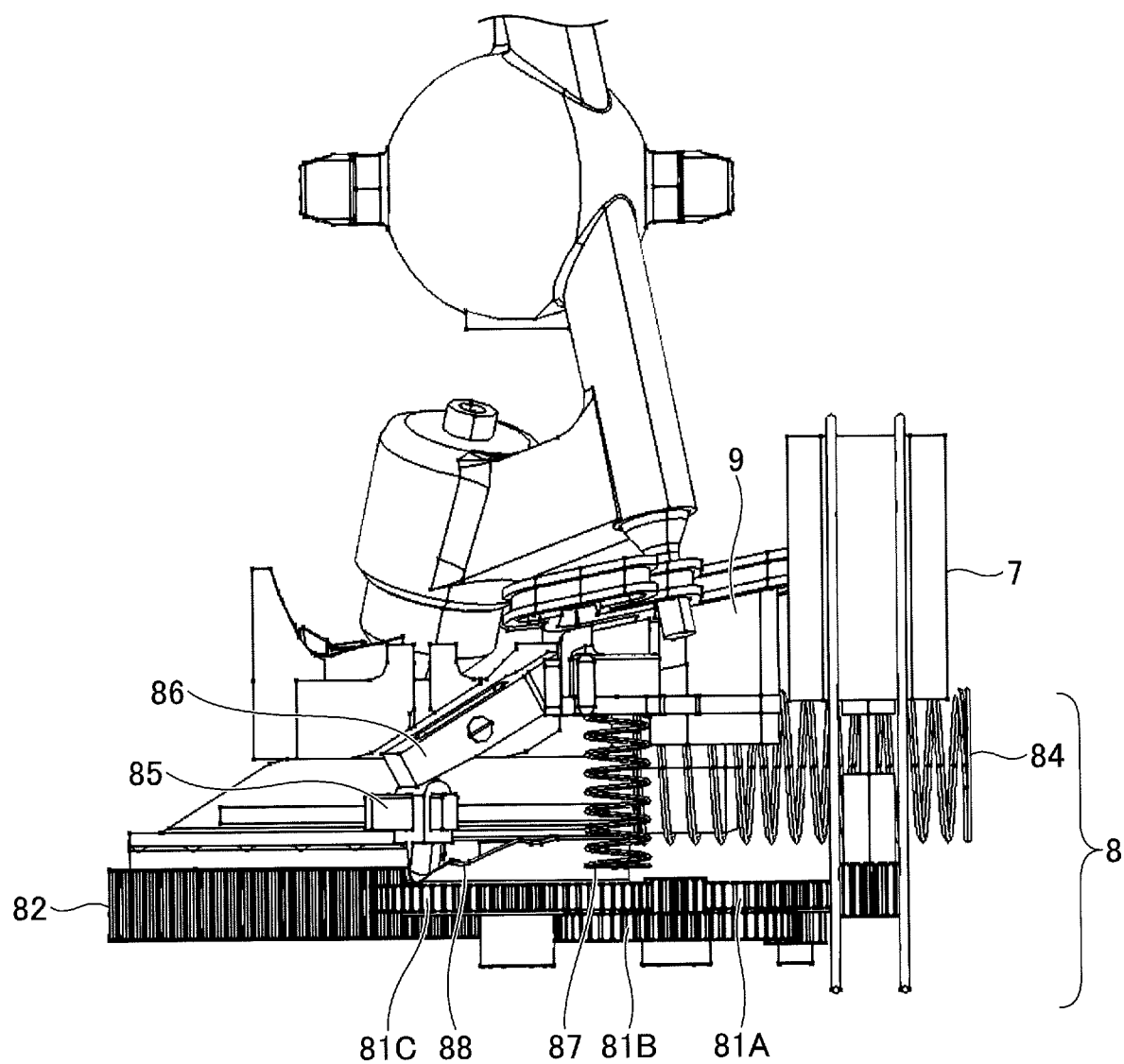
FIG. 12 is a rear view illustrating the driving mechanism.

Next, the driving mechanism 8 will be described. FIG. 10 is a bottom view illustrating the driving mechanism 8, FIG. 11 is a front view illustrating the driving mechanism 8, and FIG. 12 is a rear view illustrating the driving mechanism 8. In the following description, the left and right directions in FIG. 11 will be described as the left and right directions of the operating device 100.

The driving mechanism 8 is a mechanism configured to move the holding member 5 between the hold position and the return position, and to move the locking member 9 between the lock position and the release position. In the example of FIG. 10 through FIG. 12, the holding member 5 is positioned at the hold position, and the locking member 9 is positioned at the second lock position. As illustrated in FIG. 10 through FIG. 12, the driving mechanism 8 includes gears 81A through 81C, a rack 82, a sliding section 83, a biasing section 84, a contact 85, a connecting section 86, and a biasing section 87.

The sliding section 83 and the biasing section 84 form a hold driving mechanism that moves the holding member 5 between the hold position and the return position. In addition, the gear 81C, the contact 85, the connecting section 86, and the biasing section 87 form a lock driving mechanism that moves the locking member 9 between the lock position and the release position.

As illustrated in FIG. 10, the gears 81A through 81C are rotatably provided on the lower surface of the lower casing 4D in a state where the gears 81A through 81C mesh one another, and reduce the rotation of the motor 7 that is the driving source, to transmit the rotation to the rack 82 in a state where a driving force is amplified. More particularly, the gears 81A through 81C are arranged in a state where the gear 81A, the gear 81B, and the gear 81C mesh one another from side of the motor 7. In the following, when not distinguishing the gears 81A through 81C from one another, these gears will be referred to as gears 81. The number of gears 81 is not limited to three.

The rack 82 is provided on the lower surface of the lower casing 4D, linearly slidable in the left and right directions, in a state where the rack 82 meshes with the gear 81C (pinion gear). When the motor 7 rotates, the rack 82 moves linearly in a direction according to the direction of rotation of the motor 7. In other words, the rack 82 is driven by the motor 7 by the principle of the so-called rack-and-pinion mechanism. As illustrated in FIG. 11, the rack 82 includes a projection 821 that projects in a direction (direction of a line of sight of the drawing in FIG. 11) perpendicular to the moving direction of the rack 82.

The sliding section 83 is a member that moves the holding member 5 between the hold position and the return position, by moving in the left and right directions according to the movement of the rack 82. As illustrated in FIG. 11, the sliding section 83 includes an elevator section 831 having a lower surface that is slidable in the left and right direction on the upper surface of the lower casing 4D, and a connecting section 832 that is provided to project downward from the lower surface of the elevator section 831.

The elevator section 831 includes an upper surface and the lower surface that are horizontal, and has an approximately trapezoidal shape including a sloping section on a right end of the elevator section 831. The elevator section 831 is arranged to be slidable while supporting the lower surface of the holding member 5 on the upper surface of the elevator section 831. When the elevator section 831 slides in the right direction in a state where the holding member 5 is at the return position, the holding member 5 moves while sliding upward along the sloping section, and as illustrated in the example of FIG. 11, the holding member 5 thereafter moves to the predetermined position on the upper surface of the elevator section 831, so that the lower surface of the holding member 5 is supported on the upper surface of the elevator section 831. The position where the holding member 5 is supported on the upper surface of the elevator mechanism 831, corresponds to the hold position of the holding member 5. On the other hand, when the holding member 5 slides in the left direction, the holding member 5 moves downward along the sloping section, to the predetermined position on the upper surface of the lower casing 4D, so that the lower surface of the holding member 5 is supported on the upper surface of the elevator section 831. The position where the holding member 5 is supported on the upper surface of the lower casing 4D, corresponds to the return position. In other words, according to the sliding of the elevator mechanism 831 in the left and right directions, the holding member 5 is raised and lowered (moves in the up and down directions) between the upper surface of the elevator section 831 and the upper surface of the lower casing 4D, and moves between the hold position and the return position.

As illustrated in FIG. 11, the connecting section 832 includes an opening 833 into which the projection 821 of the rack 82 is inserted. The opening 833 is a through-hole extending in the left and right directions, and the projection 821 moves in the left and right directions inside the opening 833.

When the motor 7 rotates and the rack 82 moves in the left and right directions, the projection 821 presses against an inner wall of the opening 822 after moving inside the opening 822, to move the connecting section 832 in the left and right directions. Accordingly, the elevator section 831, that is integrally formed with the connecting section 832, slides in the left and right directions. In this embodiment, the projection 821 is provided on the rack 82, and the opening 833 is provided in the connecting section 832. However, it is possible to provide the opening 833 in the rack 82, and to provide the projection 821 on the connecting section 832.

The biasing section 84 is a compression coil spring having a left end fixed to a side surface of the lower casing 4D, and a right end fixed to a left end of the elevator section 831, and urges the elevator section 831 toward the right direction.

The contact 85 is arranged on an upper portion of the gear 81C, so as to make contact with a cam surface 88 of the gear 81C. The contact 85 is supported by the upper casing 4U to be slidable in the up and down directions. When the gear 81C rotates, the contact 85 moves in the up and down directions along the cam surface 88.

Figure 13:
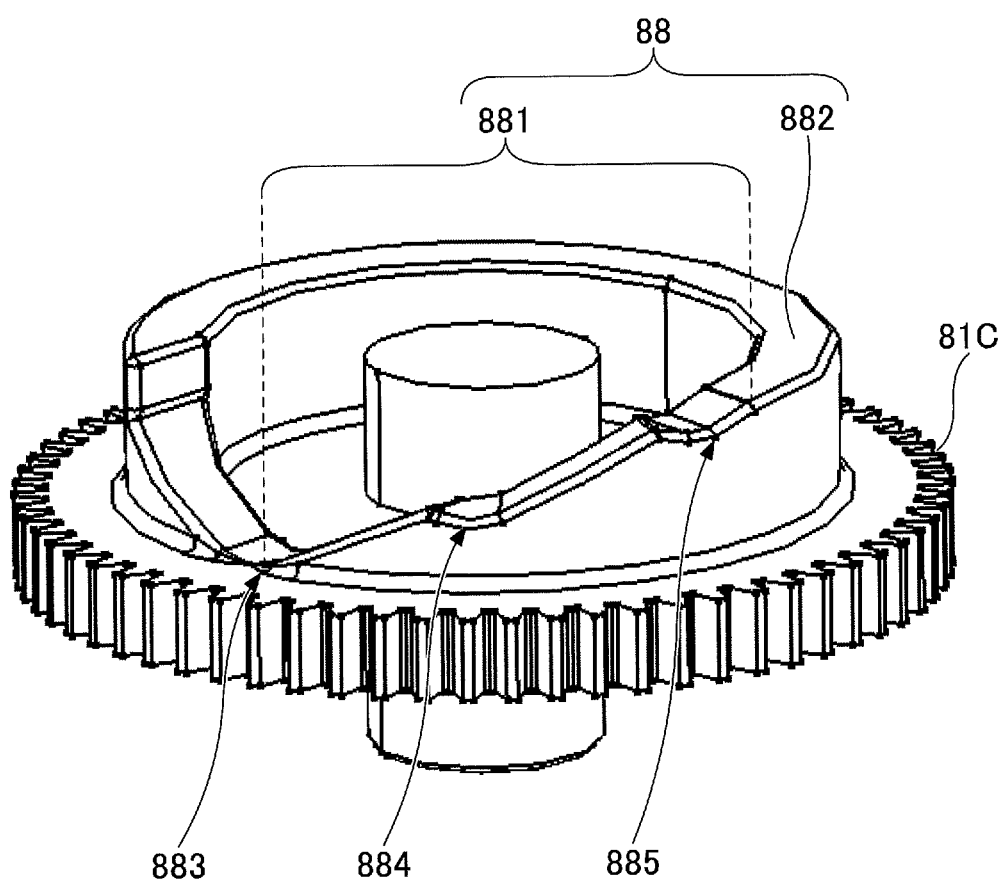
FIG. 13 is a perspective view illustrating a cam surface of a gear.

FIG. 13 is a perspective view illustrating the cam surface 88 of the gear 81C. As illustrated in FIG. 13, the cam surface 88 is an upper surface of a ring-shaped portion that projects upward from an upper surface of the gear 81C, and a center of the ring-shaped portion is an axis of rotation of the gear 81C. The cam surface 88 includes a sloping section 881 extending from the upper surface of the gear 81C, and a flat section 882 extending from an upper end of the sloping section 881 toward a direction perpendicular to the axis of rotation. A lower end portion 883 of the sloping section 881 corresponds to the second lock position, a middle portion 884 of the sloping section 881 corresponds to the first lock position, and an upper end portion 885 of the sloping section 881 and the flat section 882 correspond to the release position. In other words, when the contact 85 makes contact with the lower end portion 883, the locking member 9 is positioned at the second lock position. When the contact 85 makes contact with the middle portion 884, the locking member 9 is positioned at the first lock position. When the contact 85 makes contact with the upper end portion 885 or the flat section 882, the locking member 9 is positioned at the release position. As illustrated in FIG. 13, the lower end portion 883, the middle portion 884, and the upper end portion 885 are preferably recesses. In this case, the recess maintains the position of the gear 81C in the direction of rotation upon contact with the contact 85, so that it is possible to reduce a load applied to the motor 7.

The connecting section 86 is a rod-shaped member that connects the contact 85 and the locking member 9, and moves the locking member 9 in a direction opposite to the contact 85. The connecting section 86 is arranged so that one end thereof makes contact with an upper end of the contact 85, and the other end thereof makes contact with an upper surface of the bottom portion 91 of the locking member 9. The connecting section 86 has a shaft section at a central portion thereof, so that the connecting section 86 is rotatable in the up and down directions, and this shaft section is supported by the upper casing 4U.

The biasing section 87 is a compression coil spring having a lower end thereof fixed to the upper surface of the lower casing 4D, and an upper end thereof fixed to a lower surface of the bottom portion 91 of the locking member 9. The biasing section 87 urges the locking member 9 upward.

Next, a moving range of the rack 82 will be described. The moving range of the rack 82 includes a first zone and a second zone.

The first zone is an interval in which the driving source (motor 7) drives the hold driving mechanism via the rack 82, and the holding member 5 is moved between the hold position and the return position. More particularly, the first zone is the interval on the left side of the position where a left inner wall of the opening 833 illustrated in FIG. 11 and the projection 821 make contact, that is, the interval in which the projection 821 of the rack 82 presses against the left inner wall of the opening 833 toward the left. When the rack 82 moves in the first zone, the sliding section 83 slides according to the movement of the rack 82. Hence, the holding member 5 moves in the up and down directions.

The flat section 882 of the cam surface 88 is formed so as to make contact with the contact 85 while the rack 82 moves in the first zone. Accordingly, while the rack 82 moves in the first zone, the contact 85 makes contact with the flat section 882, and the locking member 9 is held at the release position. In other words, the flat section 882 of the cam surface 88 corresponds to a play of a driving force transmission path for not driving the lock driving mechanism (for not moving the locking member 9) while the rack 82 moves in the first zone.

The second zone is an interval in which the rack 82 drives the lock driving mechanism, and the locking member 9 is moved between the release position and the lock position. More particularly, the second zone is the interval on the right side of the position where the left inner wall of the opening 833 illustrated in FIG. 11 and the projection 821 make contact, that is, the interval in which the projection 821 of the rack 82 does not press against the left inner wall of the opening 833 toward the left. The second zone corresponds to a moving range on the right side of the first zone. When the rack 82 moves in the second zone, the sliding section 83 does not slide from the right end of the moving range, and as illustrated in FIG. 11, the holding member 5 is held at the hold position. Due to the opening 833, the rack 82 does not transmit the driving force from the driving source (motor 7) to the hold driving mechanism while the rack 82 moves in the second zone. In other words, the opening 833 corresponds to a play in a driving force transmission path for not driving the hold driving mechanism (for not moving the holding member 5) while the rack 82 moves in the second zone.

The sloping section 881 of the cam surface 88 is formed so that the contact 85 moves from the lower end portion 883 to the upper end portion 885 while the rack 82 moves in the second zone. Accordingly, the locking member 9 moves from the second lock position to the release position while the rack 82 moves in the second zone.

Next, an operation of the operating device 100 will be described. In this embodiment, during operation of a driving-motor (engine or motor) of the vehicle that is not illustrated, the holding member 5 is positioned at the hold position, and the locking member 9 is positioned at one of the first lock position, the second lock position, and the release position. On the other hand, during stop operation of the driving-motor, the locking member 9 first moves to the release position to put the operating lever 1 in a free state, and the holding member 5 then moves to the return position to return the operating lever 1 to the predetermined position. When stopping the driving-motor after the operating lever 1 returns, the driving-motor may be stopped after the holding member 5 returns to the hold position, and the locking member 9 returns to the second lock position.

Figure 15A:
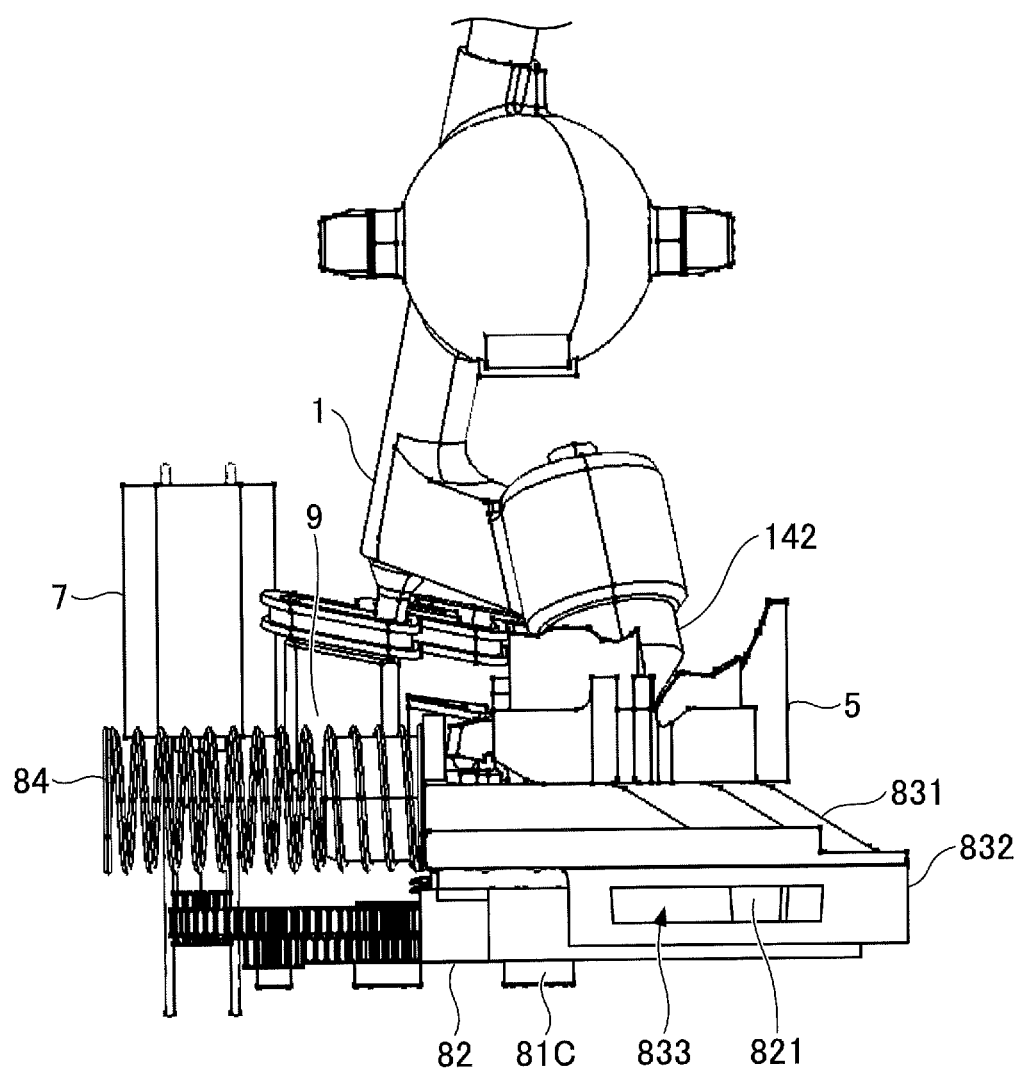
FIG. 15A is a diagram illustrating the state transition of the operating device.
Figure 15B:
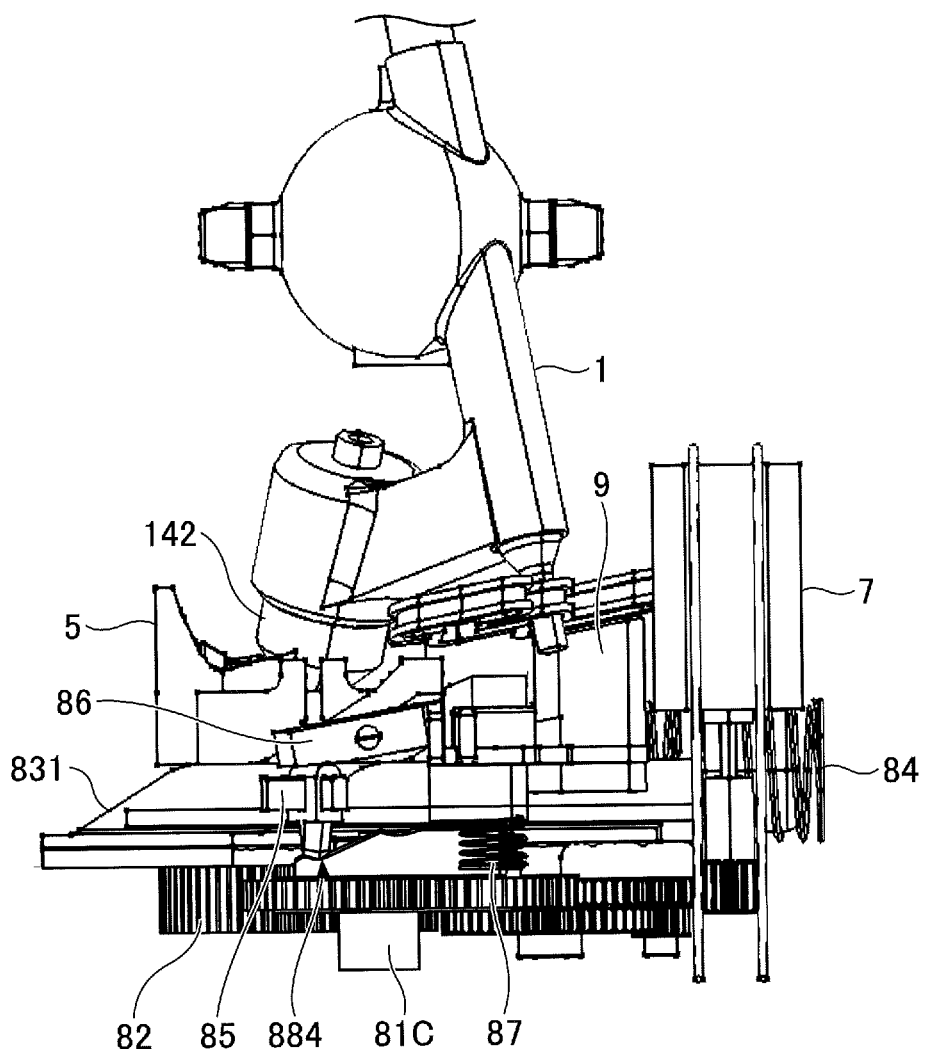
FIG. 15B is a diagram illustrating the state transition of the operating device.
Figure 16A:
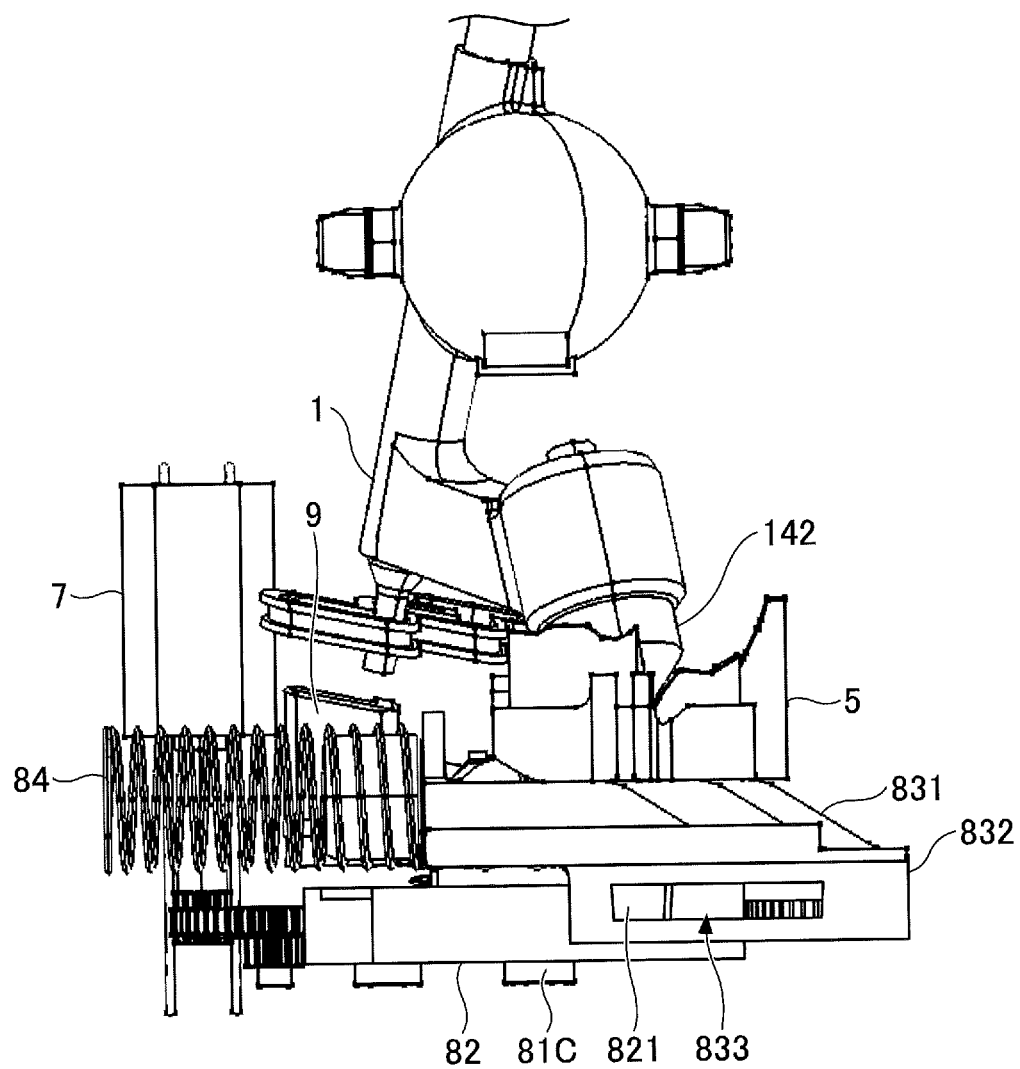
FIG. 16A is a diagram illustrating the state transition of the operating device.
Figure 16B:
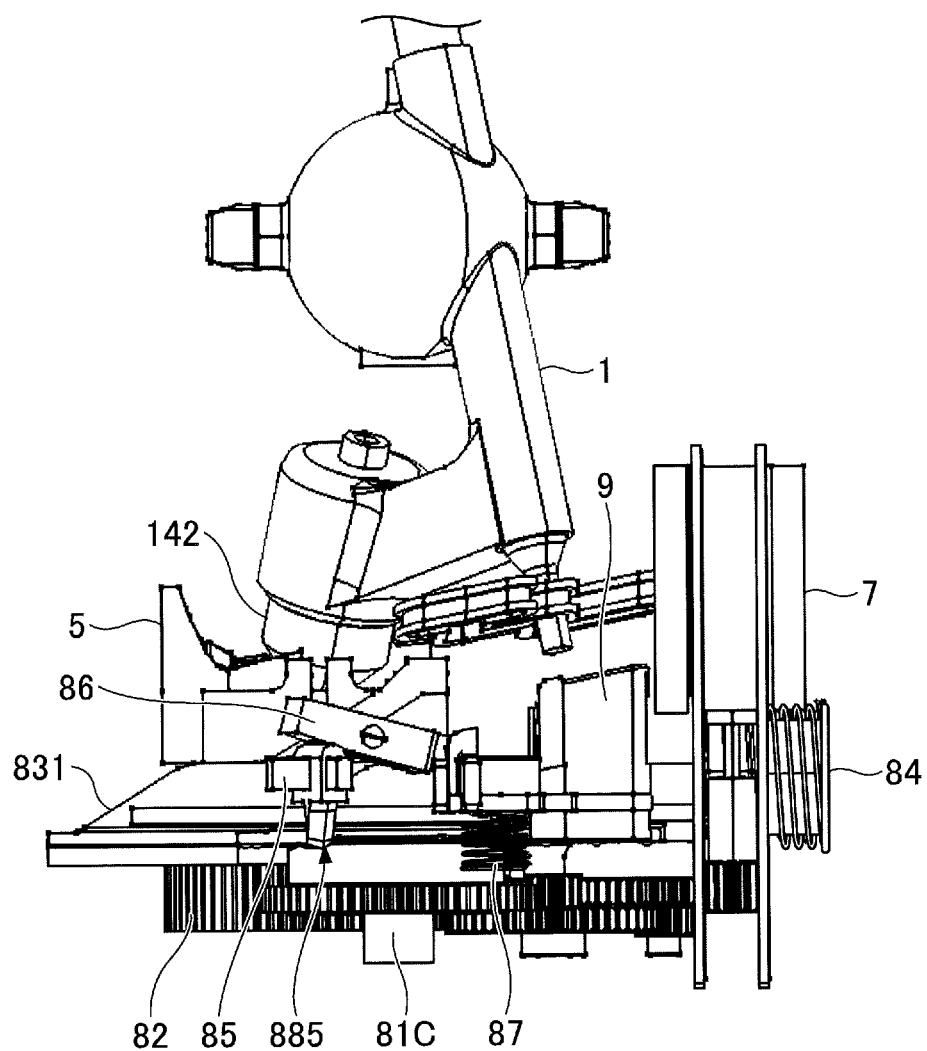
FIG. 16B is a diagram illustrating the state transition of the operating device.
Figure 17A:
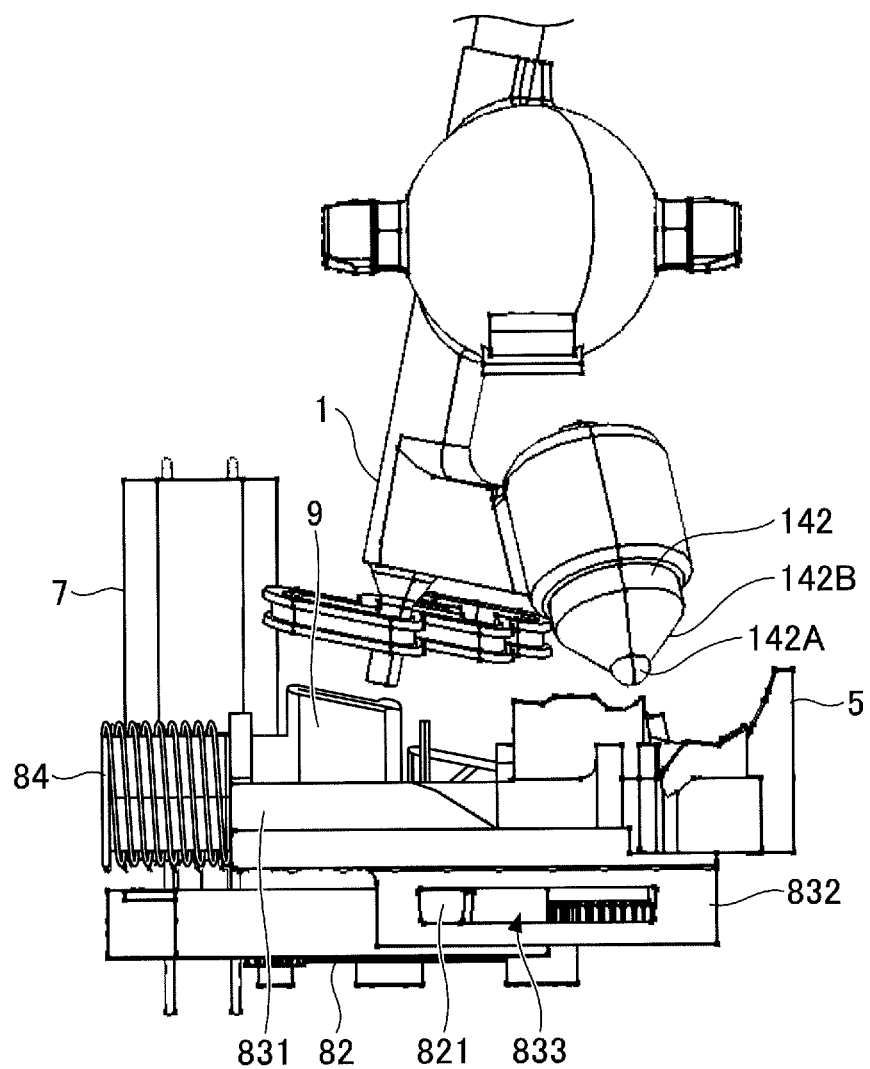
FIG. 17A is a diagram illustrating the state transition of the operating device.
Figure 17B:
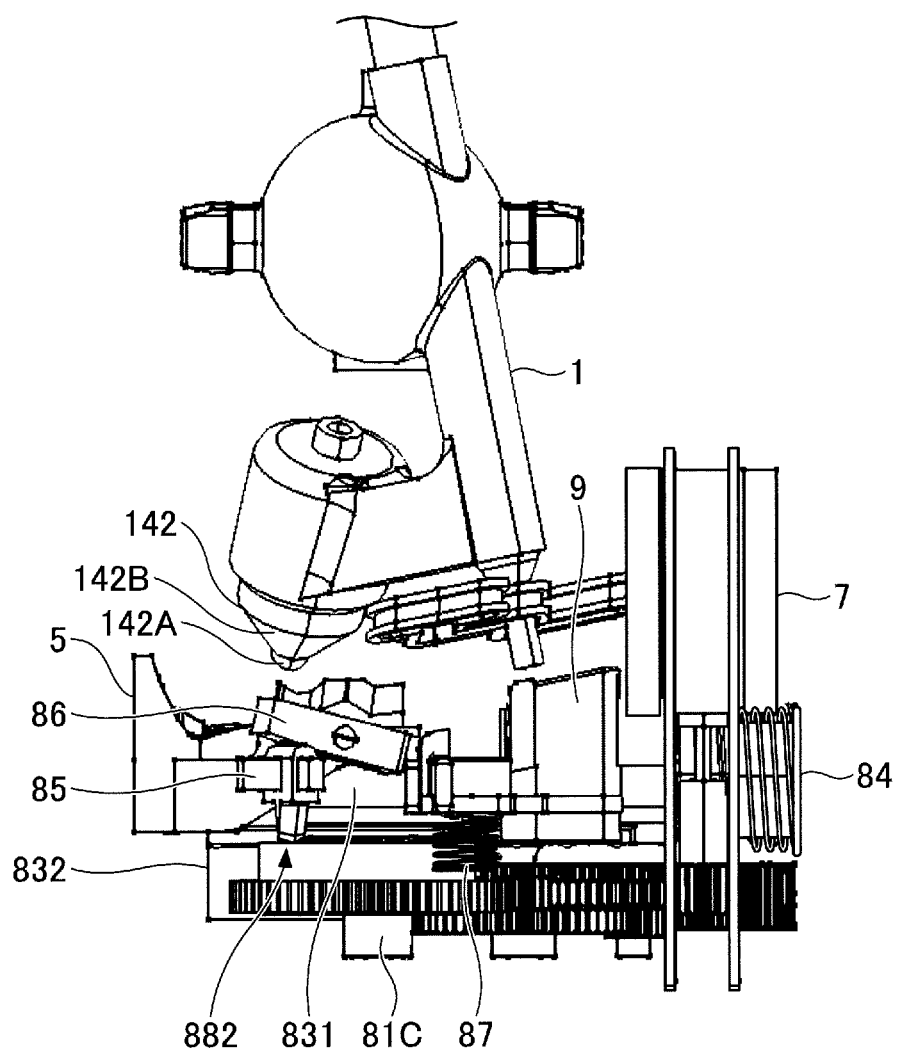
FIG. 17B is a diagram illustrating the state transition of the operating device.

FIG. 14A through FIG. 17B are diagrams illustrating state transitions of the operating device 100. FIG. 14A through FIG. 17B illustrate the internal structure (excluding the casing 4) of the operating device 100, where FIG. 14A, FIG. 15A, FIG. 16A, and FIG. 17A are front views, and FIG. 14B, FIG. 15B, FIG. 16B, and FIG. 17B are rear views. In addition, FIG. 14A through FIG. 16B illustrate the operating device 100 during operation of the driving-motor, and FIG. 17A and FIG. 17B illustrate the operating device 100 during the stop operation of the driving-motor. The position of the components, such as the rack 82 or the like, may be detected directly by a detection means (mechanical switch, optical sensor, magnetic sensor, or the like) that is not illustrated, or may be computed from a reference position of each component and a total number of rotations of the motor 7 that rotates in the moving direction. In addition, the timings at which the rotation of the motor 7 is started and stopped, the direction of rotation, the velocity, or the like of the motor 7 may be controlled by a controller that is not illustrated.

Figure 14A:
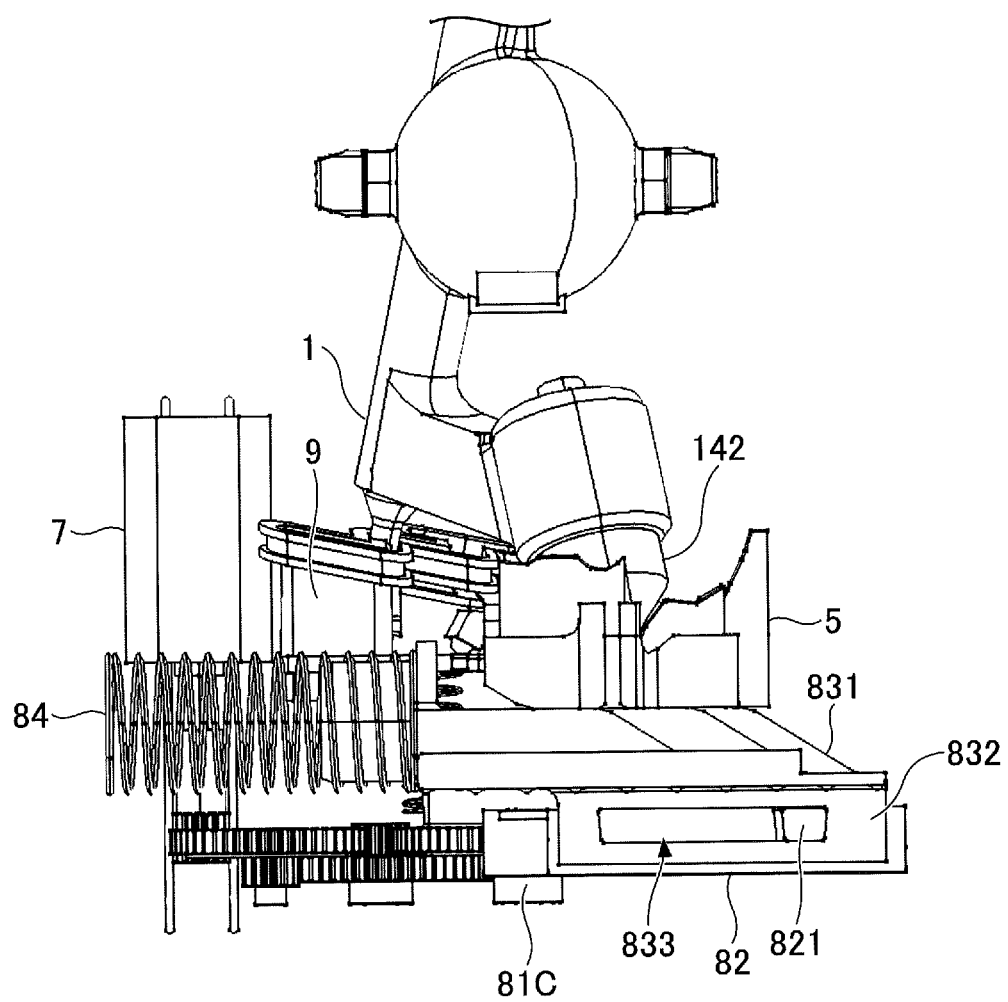
FIG. 14A is a diagram illustrating a state transition of the operating device.
Figure 14B:
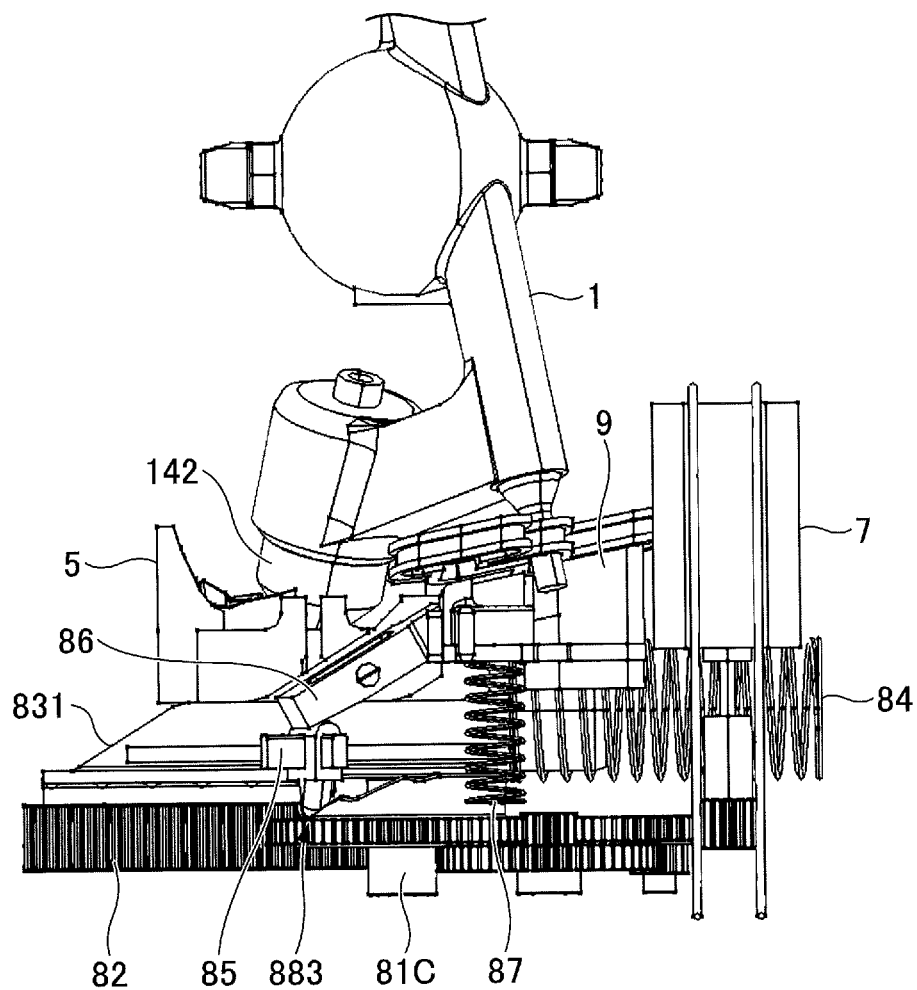
FIG. 14B is a diagram illustrating the state transition of the operating device.

FIG. 14A and FIG. 14B are diagrams illustrating the operating device 100 when the rack 82 is positioned at the right end of the second zone. When the rack 82 is positioned at the right end of the second zone (position corresponding to the second lock position), the sliding section 83 is positioned at the right end of the movable range thereof, and the holding member 5 is positioned at an upper portion of the elevator section 831, that is, at the hold position. Accordingly, the contact section 142 makes contact at one of the positions of the holding member 5, and the operating lever 1 is held at the one of the positions. In addition, the contact 85 makes contact with the lower end portion 883 of the sloping section 881, and the locking member 9 is positioned at the second lock position that is a highest position.

FIG. 15A and FIG. 15B are diagrams illustrating the operating device 100 when the rack 82 is positioned at the central portion of the second zone. At the same time as when the motor 7 rotates and the rack 82 moves to the left from the right end (refer to FIG. 14A and FIG. 14B) of the second zone, the gear 81C is driven, the gear 81C rotates, and the contact 85 is raised along the sloping section 881 from the lower end portion 883. When the contact 85 is raised, one end of the connecting section 86 is pushed upward by the contact 85 and is raised, and the other end of the connecting section 86 is lowered. When the other end of the connecting section 86 is lowered, the locking member 9 is pushed downward by the other end of the connecting section 86, and is lowered from the second lock position that is the highest position. When the rack 82 moves to the central portion of the second zone (position corresponding to the first lock position), the contact 85 makes contact with the middle portion 884 of the sloping section 881, and the locking member 9 moves to the first lock position that is an intermediate height position. While the rack 82 moves from the right end of the second zone to the central portion of the second zone, the projection 821 of the rack 82 moves inside the space of the opening 833, and the projection 821 of the rack 82 does not press against the inner wall of the opening 833, and thus, the sliding section 83 does not move in the left and right direction. Accordingly, the holding member 5 remains held at the hold position.

FIG. 16A and FIG. 16B are diagrams illustrating the operating device 100 when the rack 82 is positioned at the left end of the second zone. At the same time as when the motor 7 rotates and the rack 82 moves to the left from the central portion (refer to FIG. 15A and FIG. 15B) of the second zone, the gear 81C is driven, the gear 81C rotates, and the contact 85 is raised along the sloping section 881 from the middle portion 884. When the contact 85 is raised, one end of the connecting section 86 is pushed upward by the contact 85 and is raised, and the other end of the connecting section 86 is lowered. When the other end of the connecting section 86 is lowered, the locking member 9 is pushed downward by the other end of the connecting section 86, and is further lowered from the first lock position that is the intermediate height position. When the rack 82 moves to the left end of the second zone (position corresponding to the release position), the contact 85 makes contact with the upper end portion 885 of the sloping section 881, and the locking member 9 moves to the release position that is a lowest position. While the rack 82 moves from the central portion of the second zone to the left end of the second zone, the projection 821 of the rack 82 moves inside the space of the opening 833, and the projection 821 of the rack 82 does not press against the inner wall of the opening 833, and thus, the sliding section 83 does not move in the left and right direction. Accordingly, the holding member 5 remains held at the hold position.

FIG. 17A and FIG. 17B are diagrams illustrating the operating device 100 when the rack 82 is positioned at the left end of the first zone. When the driving-motor starts the stop operation, the motor 7 rotates, and the rack 82 moves from the left end of the second zone (refer to FIG. 16A and FIG. 16B) to the left. That is, at the same time as when the rack 82 moves in the first zone to the left, the gear 81C is driven, and the gear 81C rotates. When the gear 81C rotates, the cam surface 88 to which the contact 85 makes contact changes from the upper end portion 885 to the flat section 882, and thus, the contact 85 does not move in the up and down directions. Accordingly, the locking member 9 remains held at the release position that is the lowest position.

On the other hand, when the rack 82 moves in the first zone to the left, the left inner wall of the opening 833 is pressed to the left by the projection 821 of the rack 82, and the sliding section 83 moves to the left. When the sliding section 83 moves to the left, the holding member 5 is lowered along the sloping section provided on the right end of the elevator section 831. When the rack 82 moves to the left end of the first zone (position corresponding to the return position), the sliding section 83 is positioned at the left end of the movable range thereof, and the holding member 5 is lowered from the upper surface of the elevator section 831 to the upper surface of the lower casing 4D, that is, the return position. When the holding member 5 is lowered to the return position, the holding member 5 separates from the contact section 142 of the operating lever 1, and the contact section 142 is guided to the H-position by the sloping surface 61 of the return section 6. Hence, the operating lever 1 automatically returns to the H-position. In this state, because the locking member 9 is positioned at the release position, the operating lever 1 can be tilted to the H-position from any position.

When making the transition again from the state illustrated in FIG. 17A and FIG. 17B to the state illustrated in FIG. 16A and FIG. 16B, and the motor 7 is rotated in reverse and the rack 82 is moved to the right of the first zone, the sliding section 83 is moved to the right, integrally with the rack 72, by to the biasing section 84. When the sliding section 83 is moved to the right, an operation is performed in a reverse direction to when the sliding section 83 moves to the left as described above. When the sliding section 83 moves to the right end of the movable range thereof (refer to FIG. 16A and FIG. 16B), the holding member 5 is raised to the hold position on the upper surface of the elevator section 831. In this case, the gear 81C also rotates in reverse at the same time, but the contact 85 does not move in the up and down directions because the cam surface 88 to which the contact 85 makes contact is the flat section 882. Accordingly, the locking member 9 remains at the release position that is the lowest position.

Figure 18:
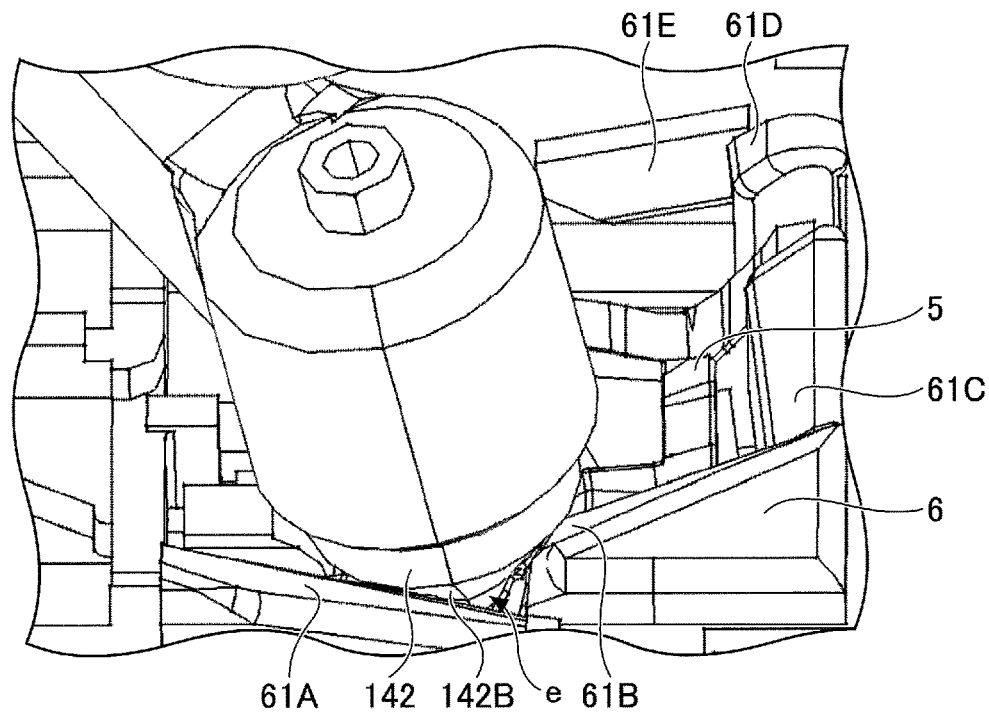
FIG. 18 is a partial enlarged view illustrating a contact section making contact with a return section at an e-position.

Next, an automatic return method for the operating lever 1 will be described, with respect to a case where the operation lever 1 is returned from the e-position to the H-position. FIG. 18 is a partial enlarged view illustrating the contact section 142 making contact with the return section 6 at the e-position. As illustrated in FIG. 18, when the holding member 5 is lowered, the tip end portion 142A (not illustrated) of the contact section 142 does not make contact with the holding member 5, and extends in the axial direction due to the biasing force of the compression coil spring that is provided therein, so that the sloping portion 142B of the contact section 142 makes contact with the return section 6. In the example of FIG. 18, the sloping portion 142B of the contact section 142 makes contact with the sloping surfaces 61A and 61B.

When the sloping portion 142B makes contact with the return section 6, the contact section 142 moves to the H-position along the sloping surface 61 of the return section 6, due to the reaction force with respect to the biasing force of the compression coil spring. In other words, the sloping portion 142B of the contact section 142 is guided to the H-position by the sloping surface of the return section 6. When the contact section 142 moves to the H-position, the operating lever 1 is held at the H-position by the return section 6, in the state where the sloping portion 142B makes contact with the sloping surface 61.

Figure 19:
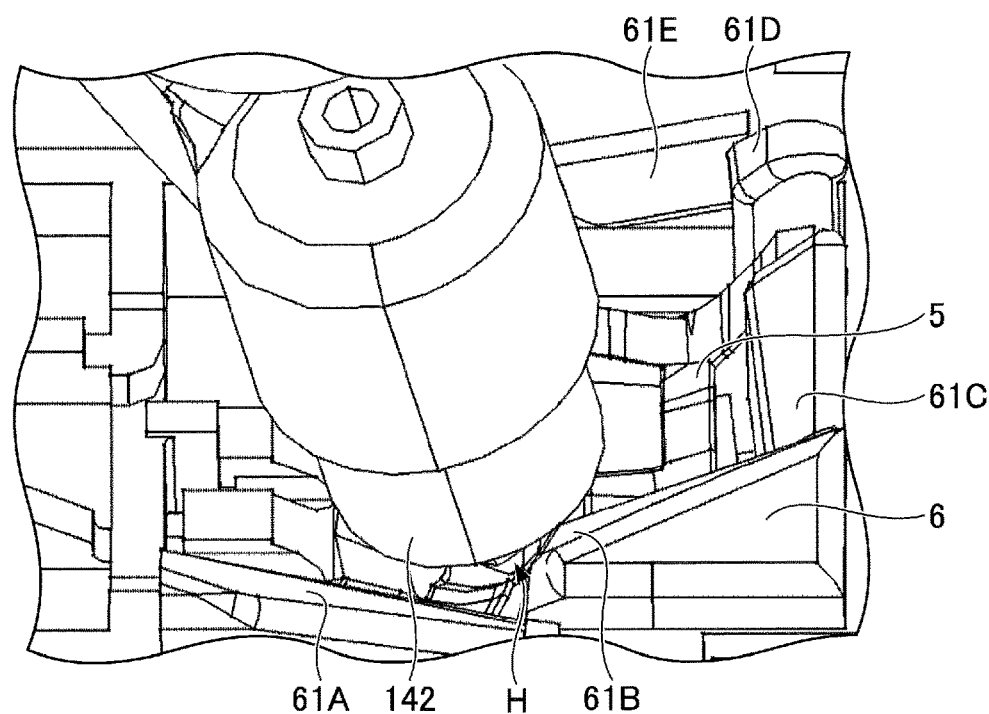
FIG. 19 is a partial enlarged view illustrating the contact section making contact with the return section at a H-position.

FIG. 19 is a partial enlarged view illustrating the contact section 142 that is held at the H-position by the return section 6. The contact section 142 is held at the H-position by the return section 6, in a state where the contact section 142 is fully extended in the axial direction. In the example of FIG. 19, the operating lever 1 is held in the state where the sloping portion 142B of the contact section 142 makes contact with the sloping surface 61B.

As described above, according to this embodiment, the driving force transmission path from the driving source to the lock driving mechanism and the driving force transmission path from the driving source to the hold driving mechanism include plays (flat section 882 and opening 833), respectively, and are driven by the driving source (motor 7) at different timings. According to such a structure, while the rack 82 moves in the first zone, the holding member 5 is driven by the hold driving mechanism and moves between the hold position and the return position, and the locking member 9 is held at the release position. In addition, while the rack 82 moves in the second zone, the holding member 5 is held at the hold position, and the locking member 9 moves between the lock position and the release position.

Hence, according to this embodiment, it is possible to respectively move the holding member 5 and the locking member 9 at different timings, by simply driving the rack 82 and the gear 81 at the same time. As a result, the operating lever 1 can be automatically returned and restricted, using a single driving source (motor 7).

In addition, according to this embodiment, during the stop operation of the driving-motor of the vehicle, the contact section 142 is guided by the return section 6 and automatically moves to the H-position, because the holding member 5 moves from the hold position to the return position. In other words, the operating lever 1 automatically returns to the H-position.

Because the shaft 11 can be returned to the H-position by simply moving the holding member 5 in the up and down directions, it is possible to reduce a dynamic force of the motor 7 required to return the operating lever 1, when compared to the conventional operating device that moves the shaft 11 directly.

Moreover, according to this embodiment, sliding contact noise is generated between the contact section 142 and the return section 6 when returning the operating lever 1. This sliding contact noise is small when compared to the sound that is generated in the conventional operating device in which the member for moving the shaft collides with the shaft. For this reason, according to this embodiment, the sound that is generated when the operating lever 1 is returned can be made small.

Further, according to this embodiment, the holding member 5 and the return section 6 are separate members. Consequently, the holding member 5 and the return section 6 can be designed separately, and the shape and the material used for the holding member 5 and the return section 6 can respectively employ the optimum design. As a result, it is possible to improve the feeling of operation of the operating device 100, and to improve the design accuracy of the sliding path 51 and the sloping surface 61.

According to each embodiment of the present invention, it is possible to automatically return and restrict the operating lever by a single driving source.

The present invention is not limited to the structures or the like of the embodiments illustrated above, and combinations with other elements may be made. In this respect, all examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operating device comprising:
a tiltable operating lever;
a holding member configured to hold the operating lever;
a locking member configured to restrict a tilt of the operating lever;
a driving source;
a hold driving mechanism, driven by the driving source, and configured to move the holding member between a hold position where the operating lever is held at a tilted position, and a return position where the operating lever returns to a predetermined position from the tilted position; and
a lock driving mechanism, driven by the driving source, and configured to move the locking member between a lock position where the tilt of the operating lever is restricted, and a release position where restricting the tilt of the operating lever is released,
wherein the hold driving mechanism and the lock driving mechanism are respectively driven by the driving source at different timings.

2. The operating device as claimed in claim 1, comprising:
a rack, driven by the driving source, and configured to move linearly in a first zone and a second zone,
wherein the driving source drives the hold driving mechanism via the rack while the rack moves in the first zone, and
wherein the driving source drives the lock driving mechanism, and the rack does not transmit a driving force from the driving source to the hold driving mechanism, while the rack moves in the second zone.

3. The operating device as claimed in claim 2, wherein the hold driving mechanism holds the holding member at the hold position while the rack moves in the second zone.

4. The operating device as claimed in claim 3, wherein the lock driving mechanism holds the locking member at the release position while the rack moves in the first zone.

5. The operating device as claimed in claim 4, wherein the lock driving mechanism includes:
a gear, driven by the driving source, and having a cam surface that includes on one surface thereof a flat section extending in a direction perpendicular to an axis of rotation,
a contact configured to move in the up and down directions along the cam surface, and
a connecting section configured to connect the contact and the locking member, and move the locking member in a direction opposite to the contact.

6. The operating device as claimed in claim 5, wherein the lock driving mechanism holds the locking member in a state where the flat section of the cam surface and the contact make contact, while the rack moves in the first zone.

7. The operating device as claimed in claim 3, wherein
one of the rack and the hold driving mechanism includes a projection that projects in a direction perpendicular with respect to a moving direction of the rack and the hold driving mechanism,
the other of the rack and the hold driving mechanism includes an opening, corresponding to the second zone, and into which the projection is inserted,
and comprising:
a sliding section including an elevator section configured to move the holding member in up and down directions, by the projection that presses against an inner wall of the opening and moves according to a movement of the rack in the first zone.

8. The operating device as claimed in claim 3, wherein the lock driving mechanism includes:
a gear, driven by the driving source, and having a cam surface that includes on one surface thereof a flat section extending in a direction perpendicular to an axis of rotation,
a contact configured to move in the up and down directions along the cam surface, and
a connecting section configured to connect the contact and the locking member, and move the locking member in a direction opposite to the contact.

9. The operating device as claimed in claim 8, wherein the lock driving mechanism holds the locking member in a state where the flat section of the cam surface and the contact make contact, while the rack moves in the first zone.

10. The operating device as claimed in claim 2, wherein the lock driving mechanism holds the locking member at the release position while the rack moves in the first zone.

11. The operating device as claimed in claim 10, wherein
one of the rack and the hold driving mechanism includes a projection that projects in a direction perpendicular with respect to a moving direction of the rack and the hold driving mechanism,
the other of the rack and the hold driving mechanism includes an opening, corresponding to the second zone, and into which the projection is inserted,
and comprising:
a sliding section including an elevator section configured to move the holding member in up and down directions, by the projection that presses against an inner wall of the opening and moves according to a movement of the rack in the first zone.

12. The operating device as claimed in claim 10, wherein the lock driving mechanism includes:
a gear, driven by the driving source, and having a cam surface that includes on one surface thereof a flat section extending in a direction perpendicular to an axis of rotation,
a contact configured to move in the up and down directions along the cam surface, and
a connecting section configured to connect the contact and the locking member, and move the locking member in a direction opposite to the contact.

13. The operating device as claimed in claim 12, wherein the lock driving mechanism holds the locking member in a state where the flat section of the cam surface and the contact make contact, while the rack moves in the first zone.

14. The operating device as claimed in claim 2, wherein
one of the rack and the hold driving mechanism includes a projection that projects in a direction perpendicular with respect to a moving direction of the rack and the hold driving mechanism,
the other of the rack and the hold driving mechanism includes an opening, corresponding to the second zone, and into which the projection is inserted,
and comprising:
a sliding section including an elevator section configured to move the holding member in up and down directions, by the projection that presses against an inner wall of the opening and moves according to a movement of the rack in the first zone.

15. The operating device as claimed in claim 2, wherein the lock driving mechanism includes:
a gear, driven by the driving source, and having a cam surface that includes on one surface thereof a flat section extending in a direction perpendicular to an axis of rotation, a contact configured to move in the up and down directions along the cam surface, and a connecting section configured to connect the contact and the locking member, and move the locking member in a direction opposite to the contact.

16. The operating device as claimed in claim 15, wherein the lock driving mechanism holds the locking member in a state where the flat section of the cam surface and the contact make contact, while the rack moves in the first zone.

17. The operating device as claimed in claim 1, further comprising:

a housing accommodating the holding member, and the locking member, wherein the holding member is positioned at the hold position, and the locking member is positioned at one of a first lock position, a second lock position, and the release position during operation of a driving-motor of the vehicle to which the operating device is fixed, and wherein the locking member first moves to the release position to put the operating lever in a free state, and the holding member then moves to the return position to return the operating lever to the predetermined position during stop operation of the driving-motor.

18. The operating device as claimed in claim 1, further comprising:

a contact section made of a resin, held on the operating lever in a biased state movable in a predetermined direction, and tiltable integrally with the operating lever; and a return section made of a resin and surrounding an outer periphery of the holding member, wherein the return section makes contact with the contact section and guides the contact section to the predetermined position, to hold the contact section at the predetermined position, when the holding member moves from the hold position to the return position, so that the return section returns the operating lever to the predetermined position.

* * * * *